United States Patent
Nakayama

(10) Patent No.: US 9,389,682 B2
(45) Date of Patent: *Jul. 12, 2016

(54) METHODS AND SYSTEMS FOR INTERACTION WITH AN EXPANDED INFORMATION SPACE

(71) Applicant: Sony Computer Entertainment Inc., Tokyo (JP)

(72) Inventor: Ryuji Nakayama, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 228 days.

This patent is subject to a terminal disclaimer.

(21) Appl. No.: 13/932,543

(22) Filed: Jul. 1, 2013

(65) Prior Publication Data

US 2014/0002351 A1 Jan. 2, 2014

Related U.S. Application Data

(60) Provisional application No. 61/667,367, filed on Jul. 2, 2012.

(51) Int. Cl.
*G06F 3/01* (2006.01)
*G06F 3/0481* (2013.01)
(Continued)

(52) U.S. Cl.
CPC ............... *G06F 3/012* (2013.01); *G06F 3/011* (2013.01); *G06F 3/017* (2013.01); *G06F 3/0425* (2013.01); *G06F 3/0483* (2013.01); *G06F 3/0485* (2013.01); *G06F 3/04815* (2013.01); *G06T 13/80* (2013.01); *G06T 15/20* (2013.01); *G09F 19/14* (2013.01); *G09F 27/00* (2013.01); *G09G 5/00* (2013.01); *H04N 5/4403* (2013.01); *H04N 13/0468* (2013.01); *H04N 21/4223* (2013.01); *H04N 21/431* (2013.01); *H04N 21/44218* (2013.01); *H04N 21/4781* (2013.01);
(Continued)

(58) Field of Classification Search
CPC ......... G06F 3/011; G06F 3/017; G06F 3/005; G06F 3/012
USPC .............................................. 345/156, 158, 8
See application file for complete search history.

(56) References Cited

U.S. PATENT DOCUMENTS 5,678,015 A    10/1997   Goh
6,115,482 A *   9/2000   Sears et al. .................. 382/114
(Continued)

FOREIGN PATENT DOCUMENTS

GB            2470754        12/2010

OTHER PUBLICATIONS

Notification of Transmittal of International Search Report and Written Opinion of the International Searching Authority issued in International Application No. PCT/US2013/048919, mailed Oct. 23, 2013 (12 total pages).

*Primary Examiner* — Fred Tzeng
(74) *Attorney, Agent, or Firm* — Martine Penilla Group, LLP

(57) ABSTRACT

A method for presenting content on a display screen is provided. The method initiates with presenting first content on the display screen, the first content being associated with a first detected viewing position of a user that is identified in a region in front of the display screen. At least part of second content is presented on the display screen along with the first content, the second content being progressively displayed along a side of the display screen in proportional response to a movement of the user from the first detected viewing position to a second detected viewing position of the user.

14 Claims, 38 Drawing Sheets

(51) Int. Cl.

| | |
|---|---|
| *G06F 3/0483* | (2013.01) |
| *G06F 3/0485* | (2013.01) |
| *G09F 27/00* | (2006.01) |
| *G09G 5/00* | (2006.01) |
| *H04N 5/44* | (2011.01) |
| *H04N 13/04* | (2006.01) |
| *G06T 13/80* | (2011.01) |
| *G06T 15/20* | (2011.01) |
| *G09F 19/14* | (2006.01) |
| *G06F 3/042* | (2006.01) |
| *H04N 21/4223* | (2011.01) |
| *H04N 21/431* | (2011.01) |
| *H04N 21/442* | (2011.01) |
| *H04N 21/478* | (2011.01) |
| *H04N 21/4782* | (2011.01) |
| *H04N 21/4788* | (2011.01) |
| *H04N 21/482* | (2011.01) |
| *G09G 3/00* | (2006.01) |

(52) U.S. Cl.
CPC ....... *H04N21/4782* (2013.01); *H04N 21/4788* (2013.01); *H04N 21/482* (2013.01); *G06T 2215/16* (2013.01); *G09G 3/003* (2013.01); *G09G 2340/04* (2013.01); *G09G 2340/14* (2013.01); *G09G 2354/00* (2013.01); *H04N 2005/4428* (2013.01)

(56) References Cited

U.S. PATENT DOCUMENTS

| | | | |
|---|---|---|---|
| 6,411,266 B1* | 6/2002 | Maguire, Jr. | 345/8 |
| 7,042,440 B2* | 5/2006 | Pryor et al. | 345/158 |
| 8,854,433 B1* | 10/2014 | Rafii | 348/47 |
| 2005/0245302 A1* | 11/2005 | Bathiche et al. | 463/1 |
| 2006/0033713 A1* | 2/2006 | Pryor | 345/158 |
| 2009/0051699 A1 | 2/2009 | Posa et al. | |
| 2009/0313584 A1 | 12/2009 | Kerr et al. | |
| 2010/0125816 A1 | 5/2010 | Bezos | |
| 2013/0278499 A1* | 10/2013 | Anderson | 345/156 |
| 2013/0335303 A1* | 12/2013 | Maciocci et al. | 345/8 |
| 2013/0342572 A1* | 12/2013 | Poulos et al. | 345/633 |
| 2014/0002444 A1* | 1/2014 | Bennett et al. | 345/419 |
| 2014/0028712 A1* | 1/2014 | Keating et al. | 345/633 |
| 2014/0118255 A1* | 5/2014 | Billerbeck | 345/158 |
| 2014/0347391 A1* | 11/2014 | Keane et al. | 345/633 |

\* cited by examiner

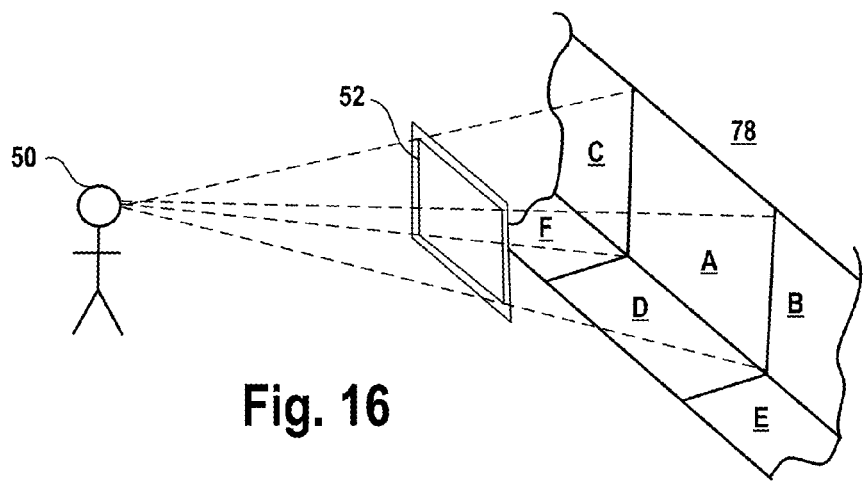
Fig. 16
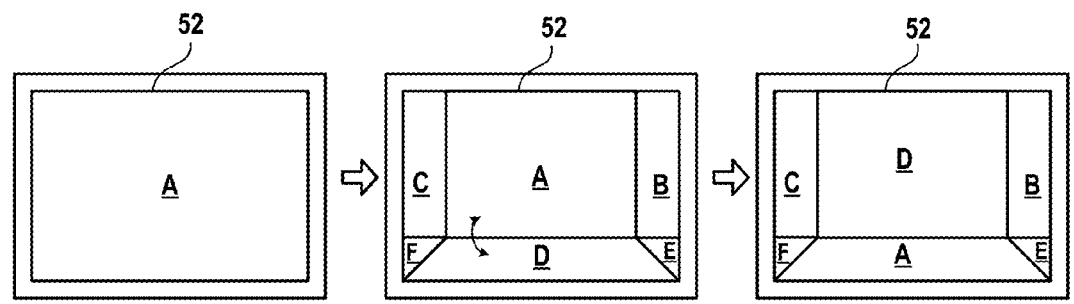
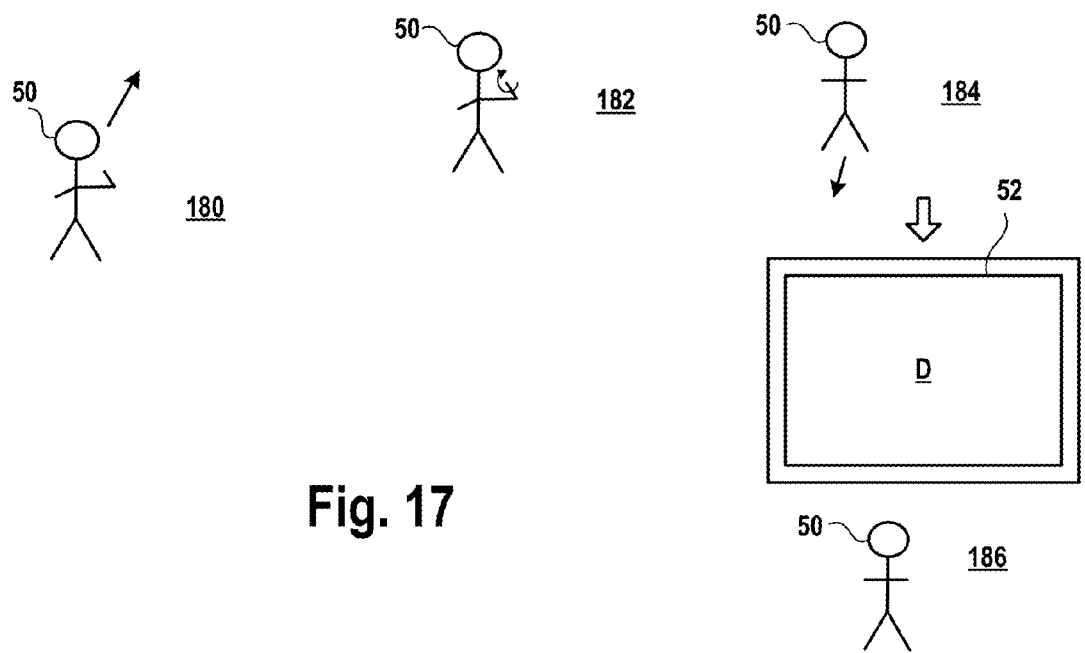
Fig. 17

METHODS AND SYSTEMS FOR INTERACTION WITH AN EXPANDED INFORMATION SPACE

CLAIM OF PRIORITY

This application claims priority to U.S. Provisional Patent Application No. 61/667,367, filed Jul. 2, 2012, entitled "METHODS AND SYSTEMS FOR INTERACTION WITH AN EXPANDED INFORMATION SPACE," the disclosure of which is herein incorporated by reference in its entirety for all purposes.

RELATED APPLICATIONS

This application is related to U.S. patent application Ser. No. 12/977,727, entitled "METHOD AND APPARATUS FOR ADJUSTING A VIEW OF A SCENE BEING DISPLAYED ACCORDING TO TRACKED HEAD MOTION," filed on Dec. 23, 2010, which is a continuation of U.S. patent application Ser. No. 10/663,236, entitled "METHOD AND APPARATUS FOR ADJUSTING A VIEW OF A SCENE BEING DISPLAYED ACCORDING TO TRACKED HEAD MOTION," filed on Sep. 15, 2003, the disclosures of which are herein incorporated by reference in their entirety for all purposes.

BACKGROUND OF THE INVENTION

As the technology of entertainment and gaming has advanced, improved user experiences have been sought. For example, high-definition televisions have provided for increased resolution, allowing video content to be presented in great clarity. Motion controllers have been developed and implemented across many video games to provide more intuitive and engaging gameplay. However, to date, the television display screen has been utilized as merely a vehicle for displaying content, and has not been conceptualized as an interactive element. It is in this context that embodiments of the invention arise.

SUMMARY OF THE INVENTION

Broadly speaking, the present invention fills these needs by providing a methods and apparatus for interactivity with an expanded information space. It should be appreciated that the present invention can be implemented in numerous ways, including as a method, a system, computer readable medium or a device. Several inventive embodiments of the present invention are described below.

In one embodiment, a method for presenting content on a display screen is provided. The method initiates with presenting first content on the display screen, the first content being associated with a first detected viewing position of a user that is identified in a region in front of the display screen. At least part of second content is presented on the display screen along with the first content, the second content being progressively displayed along a side of the display screen in proportional response to a movement of the user from the first detected viewing position to a second detected viewing position of the user.

In one embodiment, a method for presenting content on a display screen is provided. The method includes operations of assigning first content to a first render space, and assigning second content to a second render space. The first render space is presented on the display screen while tracking a position of a viewer in front of the display screen. A transition to the second render space from the first render space is presented in response to changes in viewer position, the first content and the second content remaining in the first and second render spaces during transitioning.

In one embodiment, a method for presenting content on a display screen is provided. The method initiates with presenting a first portion of a content space on the display screen. A location of a viewer in front of the display screen is tracked. In response to detecting a lateral movement of the viewer relative to the display screen, an adjacent second portion of the content space is exposed from an edge of the display screen opposite a direction of the lateral movement.

In one embodiment, a method for presenting content on a display screen is provided. The method initiates with presenting a first portion of a content space on the display screen. A location of a viewer in front of the display screen is tracked. En response to detecting a movement of the viewer towards the display screen, one or more adjacent portions of the content space are exposed from one or more respective edges of the display screen, and a size of the presented first portion is reduced.

In one embodiment, a method for presenting content on a display screen is provided. The method initiates with assigning first content to a first render space, and assigning second content to a second render space. A perspective projection of the first render space and the second render space is presented on the display screen. The perspective projection is adjusted based on tracked movement of a user in front of the display screen. In one embodiment, the adjusting of the perspective projection provides an appearance of the first and second render spaces having a substantially persistent orientation in a real space occupied by both the display screen and the viewer.

In one embodiment, a method for presenting a view of a content space is provided. The method initiates with tracking a location of a user in a vicinity of a display. A location of a virtual viewpoint in a virtual space is determined based on the tracked location of the user. A field of view of the user is determined, the field of view of the user defined by a projection of a virtual window, from a vertex defined by the virtual viewpoint, to a content space in the virtual space. The field of view of the user is rendered on the display.

In one embodiment, a method for presenting a view of a virtual space on a display is provided. The method initiates with tracking a movement of a user from an first location to a second location in a vicinity of a display. A virtual viewpoint is moved from a first location in a virtual space to a second location in the virtual space based on the tracked movement of the user, the movement of the virtual viewpoint relative to a virtual window in the virtual space being in a same direction as the movement of the user relative to the display. A field of view of the user is updated, from a first field of view corresponding to the first location of the virtual viewpoint, to a second field of view corresponding to the second location of the virtual viewpoint. The first field of view of the user is defined by a projection of a virtual window, from a vertex defined by the first location of the virtual viewpoint, to a content space in the virtual space. The second field of view of the user is defined by a projection of the virtual window, from a vertex defined by the second location of the virtual viewpoint, to the content space in the virtual space. The updating of the field of view from the first field of view to the second field of view is rendered on the display.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may be understood by reference to the following description taken in conjunction with the accompanying drawings.

FIG. 16 illustrates a plurality of render spaces wherein some of the render spaces are oriented at an angle relative to others of the render spaces, in accordance with an embodiment of the invention.

FIG. 17 illustrates an interaction with render spaces, in accordance with an embodiment of the invention.

DETAILED DESCRIPTION OF THE PREFERRED EMBODIMENTS

Figure 1:
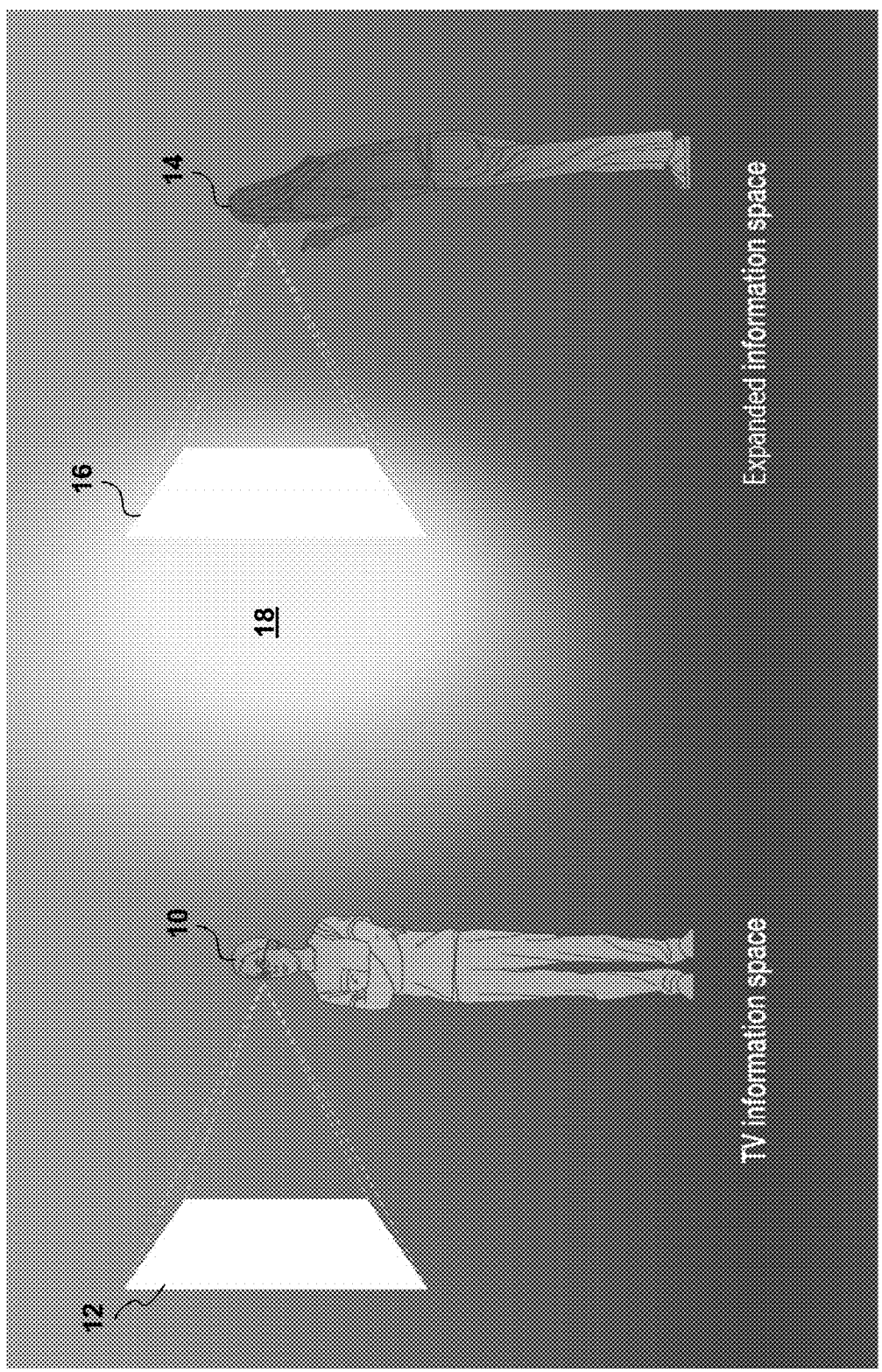
FIG. 1 illustrates a traditional TV information space and an expanded information space, in accordance with embodiments of the invention.

An invention is disclosed for providing interactivity with an expanded information space. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

Broadly speaking, embodiments of the invention provide access to an expanded viewing space presented through a flat display screen, such that the display screen functions as a "window" into the expanded viewing space. Access to the expanded viewing space is responsive to tracked movements of the user, providing to the user an effect similar to that of viewing a space through a window. Thus, the display screen is made to feel like a window into a virtual space, rather than merely a surface on which an image is displayed, by virtue of the dynamic perspective that is presented in response to the user's movements. Broadly speaking, the tracked location of the user's head will determine the user's perspective, though the entirety of the user's body may in fact be tracked.

The expanded viewing space can be configured in various forms depending upon the specific application. For example, in a first-person shooter game, the user's view of the virtual environment of the game can be controlled so that when the user approaches the display screen, the view of the virtual environment is expanded, and when the user moves to the left, the view of the virtual environment to the right of the user's original view is displayed to the user. In another example, the expanded viewing space may be configured like a stage, with the primary image content shown on the back wall of the stage, and content on the floor of the stage made viewable when the user approaches the display and looks down. Additional content can be shown to the right or left of the primary display, such content being displayed when the user moves in a direction so as to bring those portions of content into view. The user can perform context switching—changing the primary image content for a different image content—by performing a recognized gesture.

Multiple users can be accommodated through a multi-view technology which permits simultaneous display of different views to different users from the same display. Control of the interface can also be switched to different users depending upon the current state of an application.

Various triggers can provide hints to the user regarding the existence of or the specific nature of content not currently viewable but available for viewing in the expanded viewing space. Triggers can include both visual and audio cues, and can be presented based on the location of the user.

The expanded view space can be formatted in various ways to provide for different regions which may display different kinds of content. One possibility is to configure the viewing space like tiles or panels on a wall, with each tile or panel defining a specific content region. If the user starts from an initial centered position at which only a single central panel is visible, and then moves towards the display, the user will begin to see additional panels surrounding the central panel (as if approaching a window). The user could also move to the left to see a panel that is to the right of the central panel, or move up to see a panel located below the central panel, etc.

In order to navigate amongst different panels, the user could perform any of various kinds of gestures, such as swiping side-to-side or up/down. Also, the user could perform a gesture to rearrange panels, e.g. swapping the positions of a center panel and an adjacent panel. In the alternative, the user could navigate or switch panels through a remote control input device.

In some configurations, there can be a series of panels displaying related content which are arranged adjacent to each other. For example, one series of panels may relate to music, with a center panel displaying the user's music library, one flanking panel displaying a music store, and an opposite flanking panel displaying a playback interface. When the user moves in a particular direction such as towards the display screen or to one side, the user's view frustum is changed and the user is therefore able to view portions of adjacent panels. Additionally, from the center panel, there may be hints provided at the edges of either or both of the center and flanking panels, indicating to the user the existence of or the contents of the flanking panels.

Expanding upon the concept of a mosaic of tiled panels, there could be any number and arrangement of panels of content. For example, there could be various content panels with advertising panels interspersed among them. Another example would be for panels to represent various scenes or chapters of a continuous media presentation, such as a movie, a video game, an interactive story, etc. Yet another embodiment would be for panels to present channels of content, e.g. TV channels. Thus when the user partially views an adjacent panel, the user is able to preview what is currently being displayed on the channel that is displayed on the adjacent panel. This may entail mixing sound from the channel of the adjacent panel with that of the currently displayed panel.

Further, there could be a global view of the panels provided to the user, from which the user may navigate to a group/section of panels. Also, there may be nested panels, such that a user may activate or zoom into a particular panel to gain access to a group of panels.

Another concept is to provide for presentation of content in a multi-dimensional presentation space. One example would be a stage-like presentation environment, where a main content presentation occurs on a back panel of the stage, and a secondary feed of content is provided on the "floor" of the stage. When positioned in a central viewing position, the user only sees the main content presentation on the back panel of the stage. However, when the user moves up or towards the display, then the user is able to view the secondary content presented on the floor of the stage. By way of example, there could be advertisements presented on the floor of the stage.

In a similar manner, there may be content presented on "sidewalls" or a "ceiling" of the stage that are viewable depending upon the location and movement of the user.

The user may swap content from one panel with that of another by performing a gesture or by providing another type of input, e.g. controller input, voice command, etc.

When a user views content in the interactive space, they may not be aware that additional content is available in the expanded viewing space, or they might be aware that such content is available, but know nothing about its nature. Therefore, it can be useful to provide hints to the user. For example, a lower bar may appear indicating the presence of or nature of secondary content presented below the main view. When the user approaches the display, he is able to view more of the lower bar.

During display of a stream of content, the presence of content in the expanded viewing space may or may not be continuous. When it is not continuous, then an indicator hinting to the user the presence of content in the expanded space will be especially useful. Hints can include a visual indicator or an audio indicator. A visual indicator could last for the duration that the additional content is available in the expanded viewing space.

The audio output to the user can be dynamically presented based on the perspective of the user when viewing the expanded viewing space. For example, as the user moves about and his perspective changes, the audio imaging can be changed so as to be appropriate to the changed position of the user.

Further, as the user views portions of the expanded viewing space, then specific audio content can be selected or emphasized based on the portions which the user is viewing. For example, when the user moves towards the display screen and sees more of the expanded viewing space, then the audio presented can likewise be adjusted to encompass more audio content from the expanded viewing space in accordance with the portion being viewed. Or audio from the expanded viewing space which was already being presented but deemphasized will now be emphasized to a greater extent, in response to the user's movement towards the interactive viewing space.

Audio modeling could be configured to treat the display screen like a virtual window, such that as the user moves closer to the screen, the field of audio is expanded in accordance with the expanded field of view. Lateral movements would likewise produce changes in audio presentation, e.g. movement to the right side would generally block audio coming from the right side and expose/increase audio from the left side.

The presence of audio from a region not currently being viewed may indicate to the user that something interesting is occurring in that region. Accordingly, the user may shift his perspective so as to view the region of interest, and the audio will be adjusted accordingly.

When a multi-panel interface as described above is presented, there may be distinct audio streams associated with each panel. The audio streams from the panels may be mixed in proportion to the relative extent to which they are being presented to the user. For example, if only one panel is being viewed, then the user may only hear the audio stream from that panel. But as the user moves and begins to view a second panel simultaneous with the first panel, then the audio from the second panel is mixed with that of the first panel in a proportionate amount.

When multiple users are engaged in viewing a display, this presents challenges regarding how to provide the expanded viewing space to the multiple users. One solution is to employ a display technology which simultaneously provides multiple views to different users. This may require users to wear special glasses to differentiate/filter the image stream shown on the display so as to present to each individual user their own individual view of the expanded viewing space. Of course, the location and movements of each individual user would be tracked and utilized to determine the particular view of each user. If wearing special glasses, then the glasses could be tracked, and may contain additional motion sensor equipment (e.g. accelerometer, gyroscope, magnetometer, visual tracking markers, etc.) to facilitate fast and accurate tracking.

Another possibility is to provide for a single user to be identified as the controlling entity for viewing of the expanded viewing space. The selected user's movements would determine the display of the expanded viewing space. If appropriate, the control could be passed off to another user in a synchronized fashion with the content being viewed. For example in a video game, users may alternate taking turns in some fashion related to the gameplay of the video game, and the control of the view of the expanded viewing space could thus be synchronized to follow the active user who is currently taking his/her turn. The hand-off of control from one user to another could be time-based, event-based, keyed to particular inputs of the players, etc.

Another issue is that switching control from one user to another may be a jarring user experience if the concomitant change in view is immediate. Therefore, changing the active user could apply a gradual transition of the display from the perspective of one user to the next user. The transition could include first returning to a baseline view (e.g. the view as presented to a hypothetical user at some predefined central/home position) before transitioning to the view provided for the next active user. Some kind of indication may be provided to inform the users of an impending perspective switch.

In yet another example, the control of the view could be controlled based on the aggregate movements of the multiple users. For example, the view could be controlled based on an average movement vector that is determined for the combination of the users' movements. Or the view could be configured to move only when all or a majority of the users move in a similar direction.

Additionally, a user could utilize a secondary device with a display to view the expanded viewing space. The secondary device could be a portable device such as a tablet or portable gaming device, a peripheral device such as a gun with a display sight/scope, viewing goggles, etc. The position/movement of the secondary device would be tracked relative to the display screen to determine the perspective from which to present a view of the expanded viewing space.

FIG. 1 illustrates a traditional TV information space and an expanded information space, in accordance with embodiments of the invention. Shown at left in FIG. 1 is a user 10 viewing a display screen 12. In typical practice, the display screen 12 is conceptualized as a two-dimensional information space upon which images or video are displayed. However, shown at right is a user 14 viewing a display screen 16 which presents image data so as to provide the user 14 with access to an expanded three-dimensional virtual information space 18. The image display on the display screen 16 is dynamically adjusted in response to user movements to provide an appearance to the user 14 of the expanded virtual information space 18 being situated behind the display screen 16. The effect is similar to that of viewing the expanded virtual information space 18 through a window that is defined by the display screen 16. Therefore, movements of the user 14 relative to the display screen 16, including both lateral and radial movements, are tracked and utilized to adjust the image displayed on the display screen 16 to provide the effect of depth extending beyond the display screen 16. The effect of viewing objects in the expanded information space 18 is such that those objects appear to have a location in the real space occupied by both the user and the display screen. Thus, when the user 14 moves in relation to the display screen 16, objects in the expanded information space 18 are presented from various perspectives based on the movement of the user 14, so as to provide the illusion of the objects occupying a location in the real space.

Figure 2:
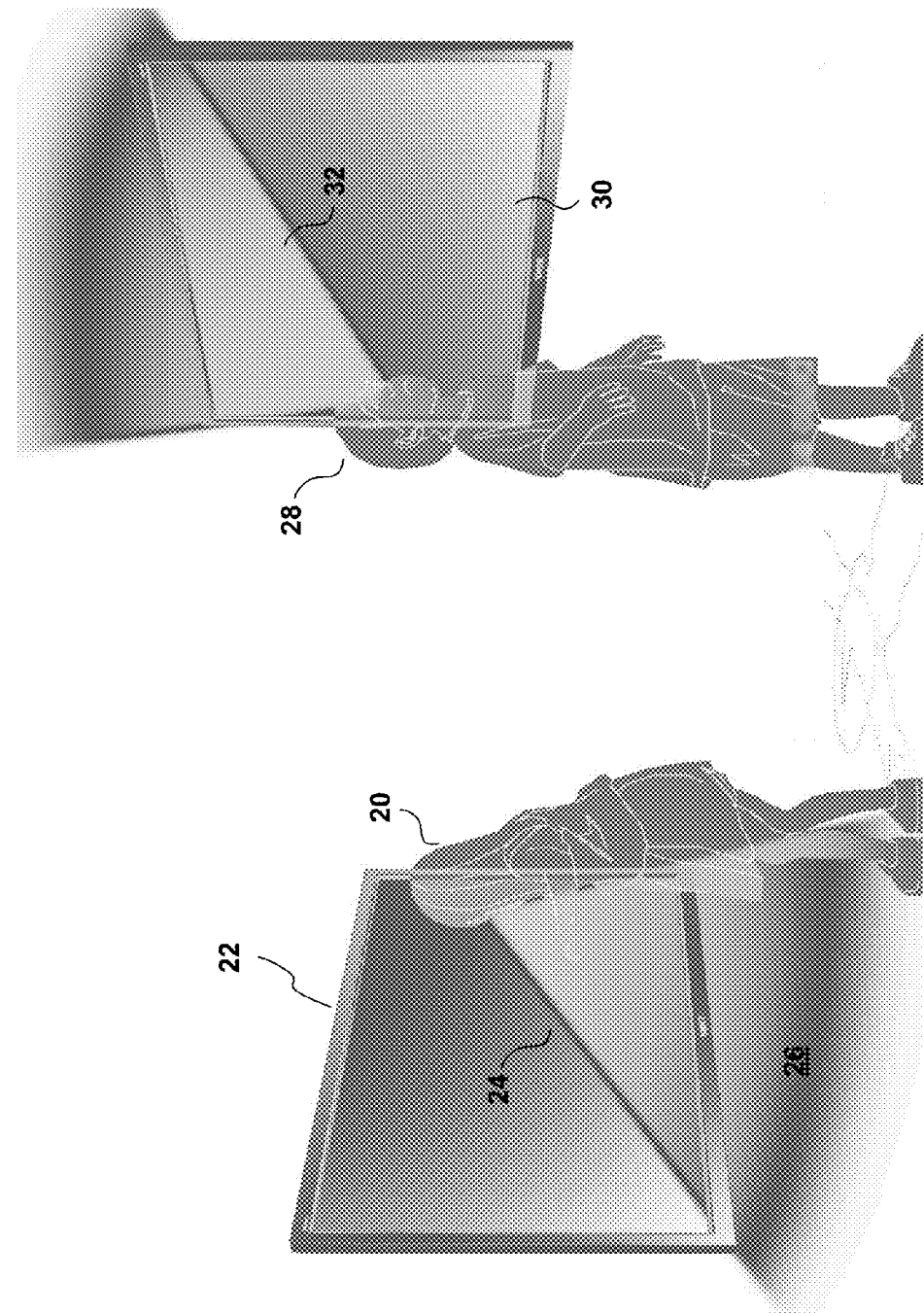
FIG. 2 illustrates users viewing expanded information spaces through respective display screens, in accordance with embodiments of the invention.

FIG. 2 illustrates users viewing expanded information spaces through respective display screens, in accordance with embodiments of the invention. As shown, the user 20 is viewing an information space 26 through a display screen 22. The user 20 has approached the display screen 22 and is viewing in a downward direction the information space 26. The user 20 has a field of view 24 that is defined by the location of the user's head and the outline of the display 22. Broadly speaking, images or video are shown on the display 22 such that the user 20 may enjoy a sense of looking through the display screen 22 in a downward direction into the information space 26. It will be appreciated that as the user 20 moves in relation to the display screen 22, the images or video presented on the display screen 22 are adjusted so as to maintain the sense of looking through the display screen 22 into the information space 26. In a similar fashion, a user 28 is shown viewing an information space 34 through a display 30. The user 28 has a field of view 32 that is defined by the user's location and the outline of the display 30. The user 28 has approached the display screen 30 and is viewing in an upward direction the information space 34. As the user 28 moves in relation to the display screen 30, the image display on the display screen 30 is adjusted to provide an appearance to the user 28 of viewing the information space 34 as if the linked through a window defined by the display screen 30. It will be appreciated that the information spaces 26 and 34 may be populated with any number of content items.

Figure 3:
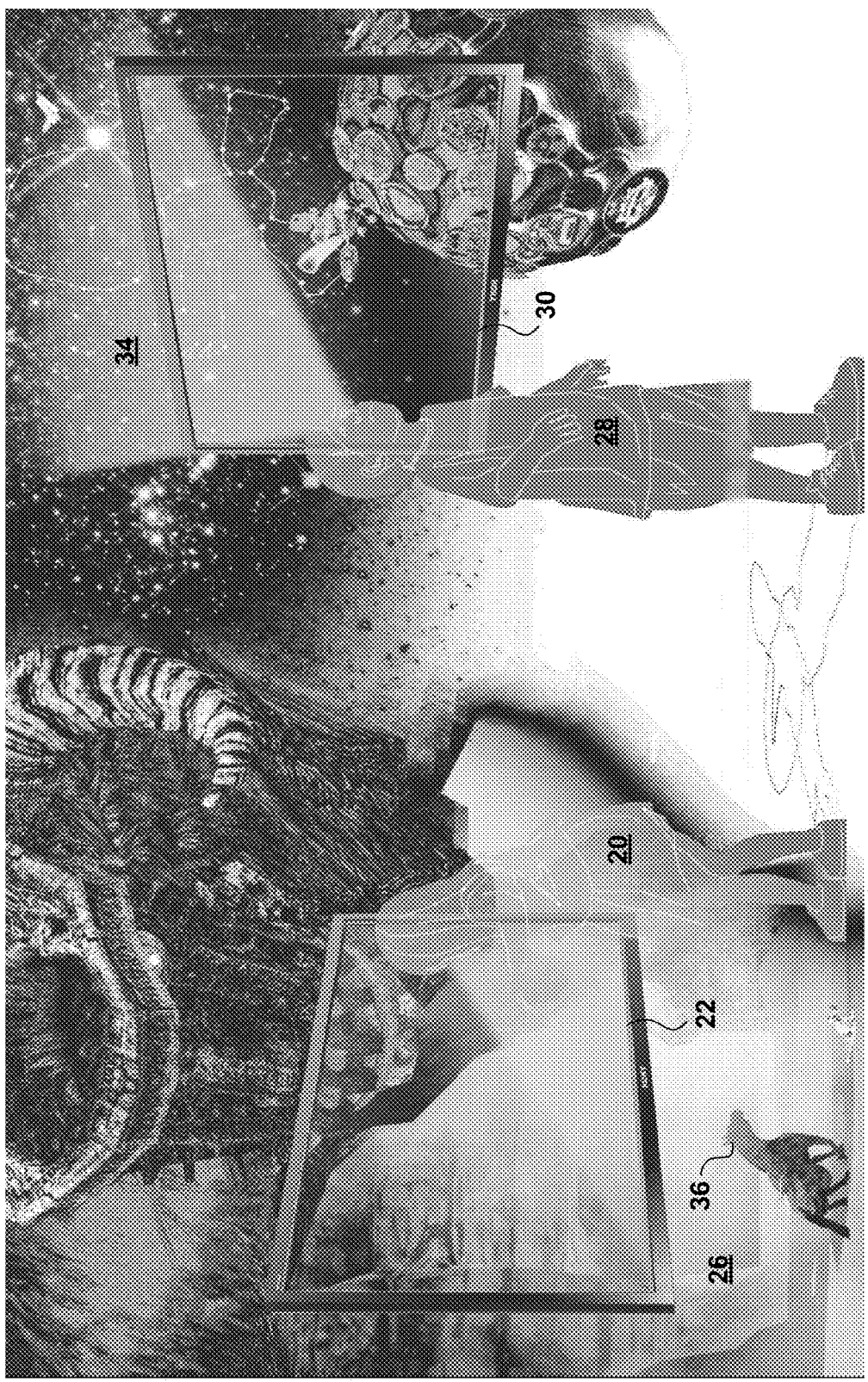
FIG. 3 illustrates information spaces being populated with various objects, in accordance with embodiments of the invention.

FIG. 3 illustrates information spaces being populated with various objects, in accordance with embodiments of the invention. In the information space 26, a horse 36 is present in a lower region of the information space 26. By approaching the display screen 22 and looking in a downward direction, the user 20 is provided with visual access to the lower region of the information space 26, and is able to view the horse 36. It will be appreciated that if the user 20 were to back away from the display screen 22, then the horse 36 would no longer be visible in the display screen 22, as the image display presented on the display screen 22 would be adjusted based on the new location of the user 20. At right, the information space 34 is shown to include a night sky. The user 28 is able to view the night sky 34 upon approaching the display screen 30 and viewing in an upward direction. The image displayed on the display screen 30 is rendered to provide user 28 with a sense of viewing the night sky through a window defined by the display screen 30. In a similar manner as discussed in relation to user 20, if the user 28 worked back away from the display screen, then portions of the night sky in the information space 34 would no longer be visible as the image shown on the display screen 30 is adjusted based on the new location of the user 28 so as to maintain the effect of viewing through a window.

By providing to users in appearance on a display screen of a three-dimensional information space having a depth that extends beyond the display screen, users are provided with a significantly enhanced immersive experience, where users can feel as if the information space exists in the real space which they and the display screen occupy.

Figure 4:
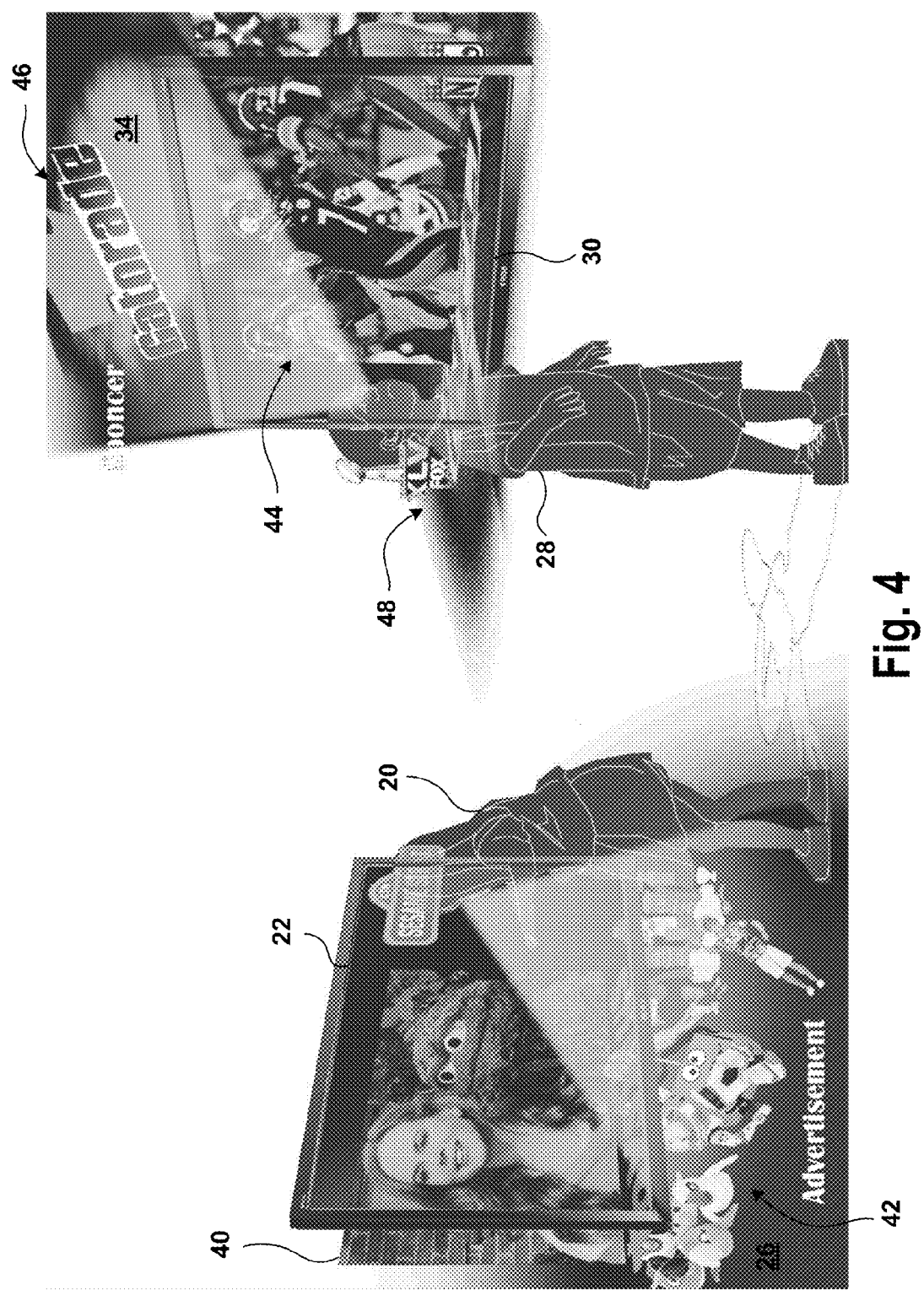
FIG. 4 illustrates additional examples wherein content is presented in an expanded information space, in accordance with embodiments of the invention.

FIG. 4 illustrates additional examples wherein content is presented in an expanded information space, in accordance with embodiments of the invention. As can be seen, a television program 40 is presented in the expanded information space 26. The television program 40 is presented in the expanded information space 26 such that the rendering plane of the video of the program appears to be recessed from the display screen 22 at a given depth. Therefore, when the user 20 is situated in front of the display screen 22 at a far enough distance, then the video rendering of the television program 40 in the expanded information space 26 is such that the television program 40 occupies the entirety of the area of the display screen 22. However, when the user 20 approaches the display screen 22, then in accordance with the change in perspective of the user 20, additional regions of the expanded view space are presented to the user 20 on the display screen 22. Merely by way of example, in one embodiment an advertisement 42 can be positioned below and in front of the television program 40 in the expanded information space 26. Thus the advertisement 42 becomes viewable to the user 20 when the user 20 approaches the display screen 22 or otherwise positions herself so as to be able to view the region of the expanded information space 26 which includes the advertisement 42, such as by moving or standing up in a position that affords such a view.

In the information space 34 which is being viewed by the user 28 through the display screen 30, a television broadcast 44 of a football game is being presented. The planar rendering of the television broadcast 44 in the expanded information space 34 is presented so as to appear to be substantially parallel with the display screen 30. In this manner, when the user 28 is situated at a far enough distance away from the display screen 30, then the rendering of the television broadcast 44 may occupy the entirety of the area of the display screen 30. But when the user 28 approaches the display screen 30, then in accordance with the changed position of the user 28, the presentation of the information space 34 is adjusted so that the user 28 experiences and effect akin to viewing the information space 34 through a window defined by the display screen 30. By way of example, a sponsors advertisement or other information can be presented in a region 46 above the rendering of the television broadcast 44. As shown, the region 46 may be defined as a planar region oriented at an angle to the television broadcast rendering 44 towards the user 28. Additional information can be presented in a region 48 below and/or in front of the rendering of the television broadcast 44. By way of example, in the illustrated embodiment a league associated with the football game is shown in the region 48 of the information space 34.

Figure 5:
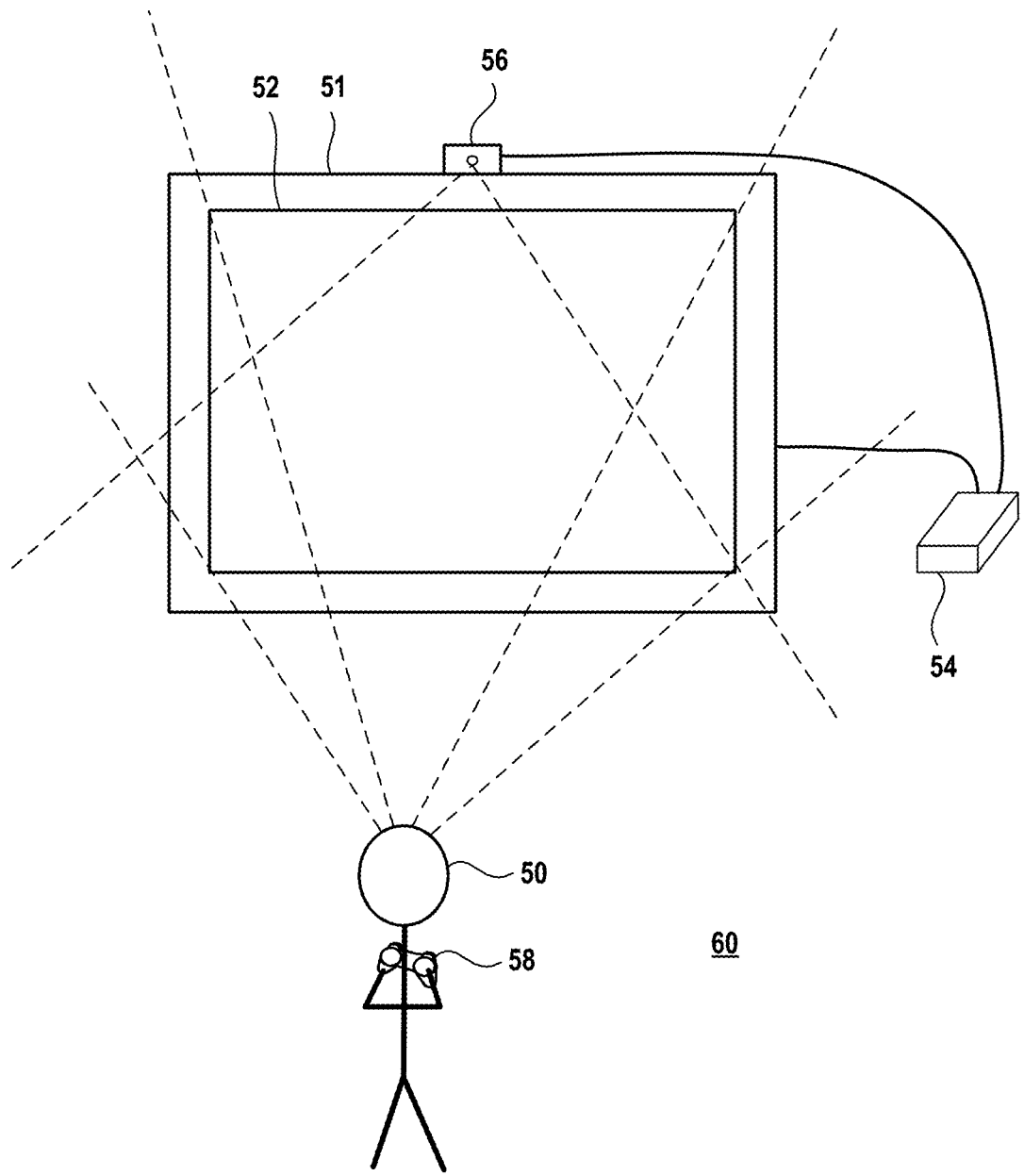
FIG. 5 illustrates a system for presenting and providing interactivity with content, in accordance with an embodiment of the invention.

FIG. 5 illustrates a system for presenting and providing interactivity with content, in accordance with an embodiment of the invention. As shown, a user 50 views content presented on a display screen 52 of a display 51. It will be appreciated that the display 51 can be any of various devices having a display screen, such as a television, monitor, a projection surface upon which an image is projected, laptop computer, tablet computer, cellular phone, personal digital assistant, etc. A computing device 54 supplies image data and audio data to the display so as to effect rendering of the content on the display screen 52. An image capture device 56 is provided for capturing images of the interactive environment 60 in which the user 50 is situated. It will be appreciated that the computing device 54 can be any of various devices generally having a processor and memory for storing data and executing program instructions, including but not limited to a general purpose computer, a special purpose computer, a gaming console, a set-top box, a personal computer, etc. The computing device 54 can be locally connected to the display and image capture device, or may be remotely connected via a network. Images of the interactive environment 56 which are captured by the image capture device can be analyzed by the computing device 54 to determine and track the location of the user 50. In some embodiments, the analysis of the captured image stream includes detection of and tracking of the face of the user 50. In some embodiments, the analysis of the captured image stream can include detection and tracking of other parts of the user 50, and may employ any of various methods for detection and tracking a location of a user. Optionally, the user 50 may operate a controller 58, which may communicate wirelessly with the computing device 54. The controller 58 can be operated by the user 50 to provide input for interaction with content presented on the display screen 52. Merely by way of example, the controller may include any of various input devices, such as a button, joystick, touch-sensitive pad, keyboard, motion sensors, etc.

Figure 6:
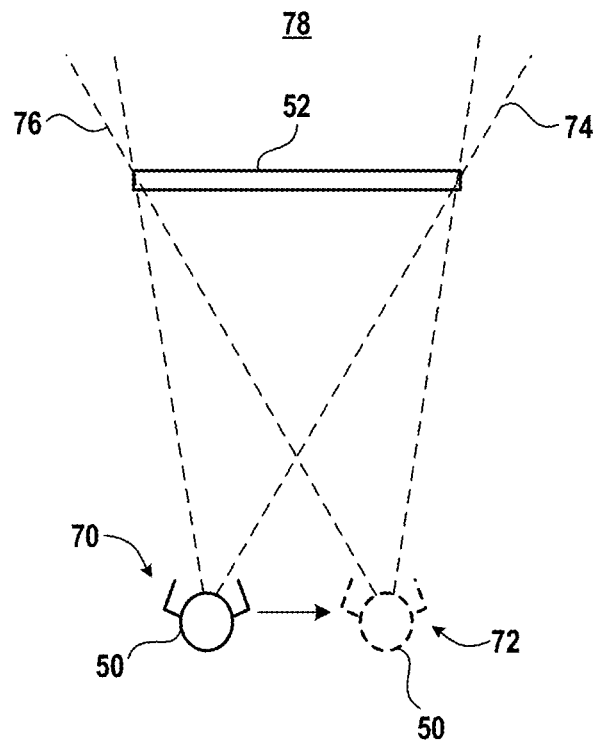
FIG. 6 illustrates a user positioned in front of a display screen and moving laterally relative to the display screen, in accordance with an embodiment of the invention.

FIG. 6 illustrates the user 50 positioned in front of the display screen 52 and moving laterally relative to the display screen 52, in accordance with an embodiment of the invention. As has been described, a view of a three-dimensional information space 78 is rendered on the display screen and adjusted in response to the user's movements so as to provide to the user 50 a sense of the display screen 52 acting as a window into the three-dimensional information space 78. The effect is such that a stationary object in the information space 78 will be presented onscreen so as to appear to have a fixed position in the real space behind the display screen 52. As shown, the user 50 is initially at a location 70. The user's view 74 of the information space 78 is defined by a projection of the display screen 52 acting as a virtual window from a viewpoint defined based on the location 70 of the user 50 into the information space 78. When the user 50 moves laterally to a new location 72, then the user 50 has an updated view 76 that is defined based on the new location 72 of the user 50. As can be seen, when the user moves to the right from location 70 to location 72, then the user's field of view, broadly speaking, shifts in the opposite direction towards the left. As rendered on the display screen, the result is that a portion of the information space 78 previously not visible is revealed from the edge of the display screen 52 opposite the direction of the lateral movement of the user.

Figure 7:
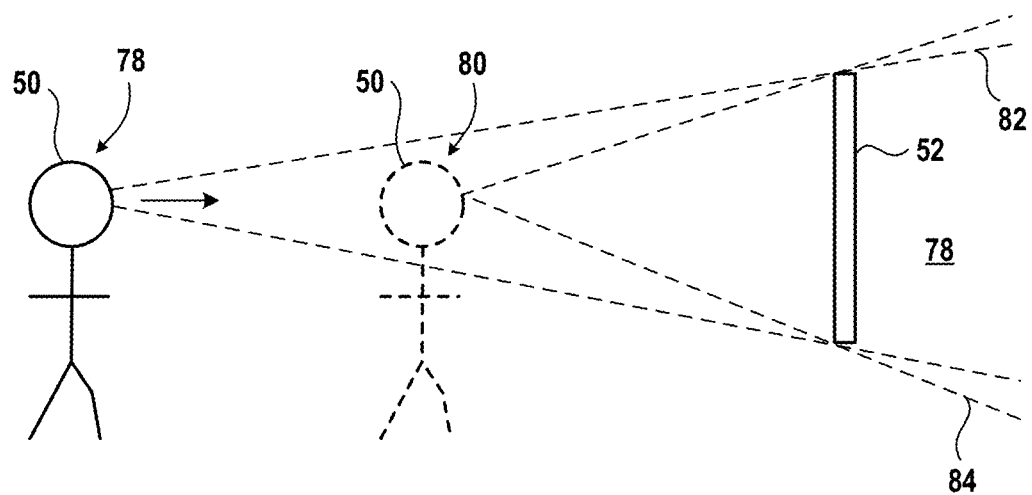
FIG. 7 illustrates a user moving radially relative to a display, in accordance with an embodiment of the invention.

FIG. 7 illustrates a user moving radially relative to a display, in accordance with an embodiment of the invention. When the user 50 is positioned at the location 78, then the presentation of the information space 78 is defined by the view 82, which is in turn defined based on a projection of a virtual window defined by the display screen 52 from a viewpoint defined by the location of the user 50 into the information space 78. When the user 50 moves from the location 78 to the location 80, then an updated view 84 of the information space 78 is presented on the display screen 52. Because the user 50 has moved toward the display screen 52, the updated view 84 is expanded as compared to the original view 82 associated with the location 78. Thus when presented onscreen, as the user 50 moves toward the display screen 52, previously shown portions of the information space 78 on the display screen 52 are generally reduced in size as additional portions of the information space are progressively introduced from edges of the display screen 52.

It will be appreciated that by adjusting the view of the information space 78 in response to the lateral and radial movements of the user 50 relative to the display screen 52 as described herein, an effect is provided whereby the display screen 52 acts as a window through which the information space 78 is viewable by the user 50. In this manner, the information space 78 will appear to be located in the real space behind the display screen 52.

Figure 8:
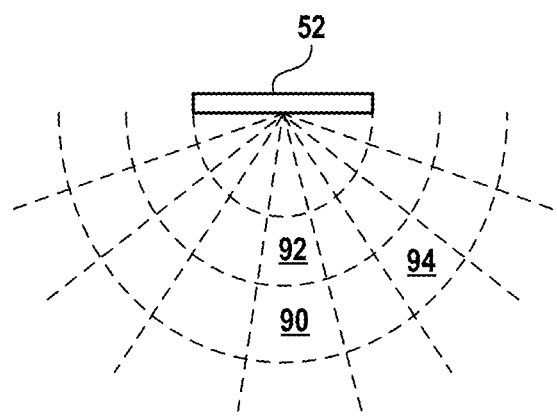
FIG. 8 illustrates an overhead view of an interactive space, showing a plurality of zones within the interactive real space, in accordance with an embodiment of the invention.

In some embodiments, the responsiveness of the adjustments to the view based on the location of the user can be modified to provide for a desired user experience. For example, FIG. 8 illustrates an overhead view of an interactive space, showing a plurality of zones within the interactive real space. In one embodiment, responsiveness to user movement increases as the radial distance of the user from the display screen 52 decreases. Therefore, a zone 92 may have greater sensitivity to changes in the user's location than a zone 90. In another embodiment, responsiveness to user movement increases as lateral movement away from center increases. Thus, for example, a zone 94 may be configured to have greater sensitivity to changes in the user's location than the zone 90. Thus, as a user moves towards the display screen and/or away from a centered location, then the sensitivity to the user's movements increases. This can provide for a better user experience by providing less sensitivity in certain regions so that the user may move without significantly impacting the image presentation of the information space on the display screen 52. It will be appreciated that in another embodiment, the sensitivity may vary continuously within the interactive space, rather than defining distinct zones of sensitivity.

Figure 9:
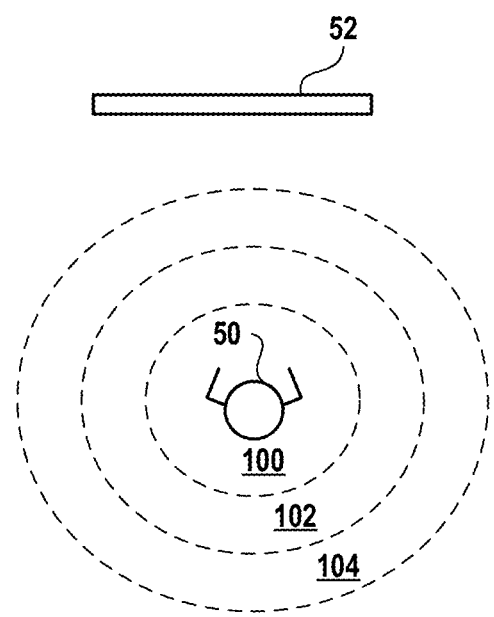
FIG. 9 illustrates various zones of sensitivity centered about a user, in accordance with an embodiment of the invention.

FIG. 9 illustrates various zones of sensitivity centered about a user 50, in accordance with an embodiment of the invention. In one embodiment, the sensitivity to the user's movements increases as the user 50 moves away from a central location. In the illustrated embodiment, a zone 100 is defined in which the sensitivity to the user's movements are zero or a minimal amount. This may be useful in providing the user a zone in which his movements do not effect significant changes to the rendering on the display screen. For example, when a user is watching a program, he may not wish to have every movement effect a substantial change in the rendering on the display screen. Thus, a zone having little to no sensitivity can be defined. The zone 102 has an increased sensitivity over zone 100, while zone 104 has an increased sensitivity over the zone 102. In this manner, as the user moves away from a central location defined in the zone 100, the sensitivity to the user's movements increases.

Figure 10:
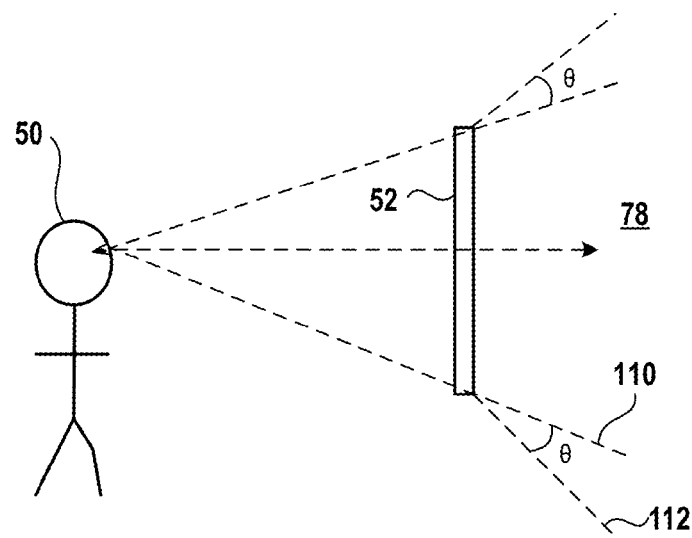
FIG. 10 illustrates a side view of a user viewing an information space, via a display screen, in accordance with an embodiment of the invention.

FIG. 10 illustrates a side view of a user viewing the information space 78, via the display screen 52, in accordance with an embodiment of the invention. In one embodiment, the view of the user 50 that is presented on the display screen 52 is determined by projecting a virtual window from a vertex position defined by the relative position of the user 50 to the display screen 52, into the information space 78. When the projection of the virtual window is a direct linear projection from the vertex that is defined by the position of the user 50 relative to the display screen 52, the user 50 is afforded a view 110 of the information space 78. However, it may be the case that providing such a view does not provide the user 50 with as expansive a view of the information space 78 as is desirable. For example, this may be the case when the user 50 is situated relatively far away from the display screen 52, such that the display screen 52 occupies only a small portion of the user's actual field of view in the real space of the interactive environment. Therefore, in one embodiment the top and bottom projections of the virtual window which define the user's view of the information space 78 are vertically expanded by an angle θ relative to the linear projections of the virtual window. In this manner, the user 50 is provided with an expanded view 112, top to bottom, of the information space 78. While this is not a wholly realistic method of presenting a view of the information space 78 to the user 50, as the display screen is not acting as a normal window, it may be useful in certain situations so that the user 50 is not required to perform excessive movements in order to view certain regions of the information space 78 on the display screen 52.

Figure 11:
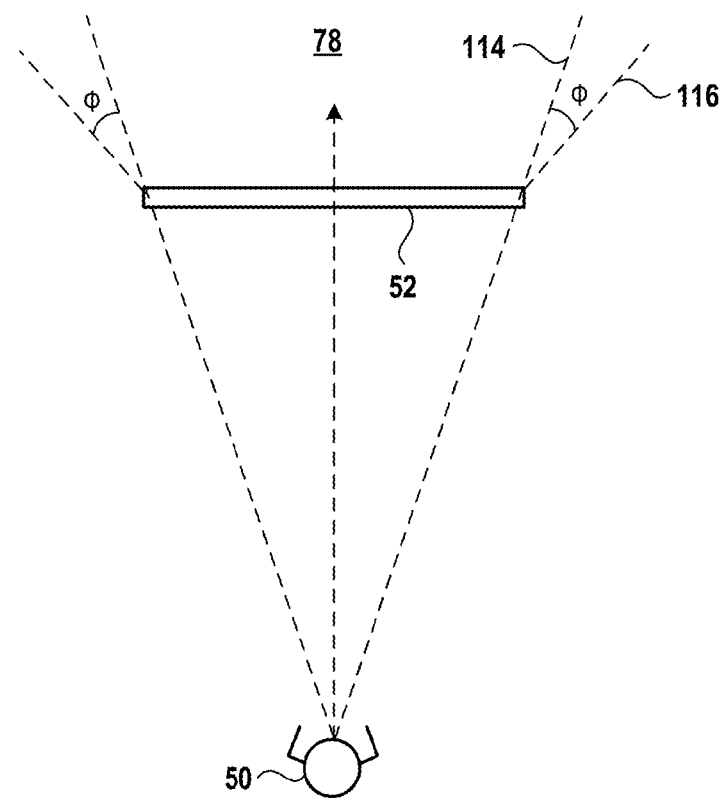
FIG. 11 illustrates an overhead view of a user viewing an information space through a display screen, in accordance with an embodiment of the invention.

FIG. 11 illustrates an overhead view of the user 50 viewing the information space 78 through the display screen 52. As with the embodiment described with reference to FIG. 10, the view 114 of the information space 78 can be defined by a linear projection of a virtual window from a vertex defined by the position of user 50 relative to the display screen 52, into the information space 78. However, in one embodiment, the left and right edge projections of the virtual window are horizontally expanded by an angle φ relative to the linear projection of the virtual window, thereby defining an expanded view 116 of the information space 78. This expanded view 116 enables the user 52 view a wider region, left to right, of the information space 78 then would otherwise normally be presented.

Figure 12:
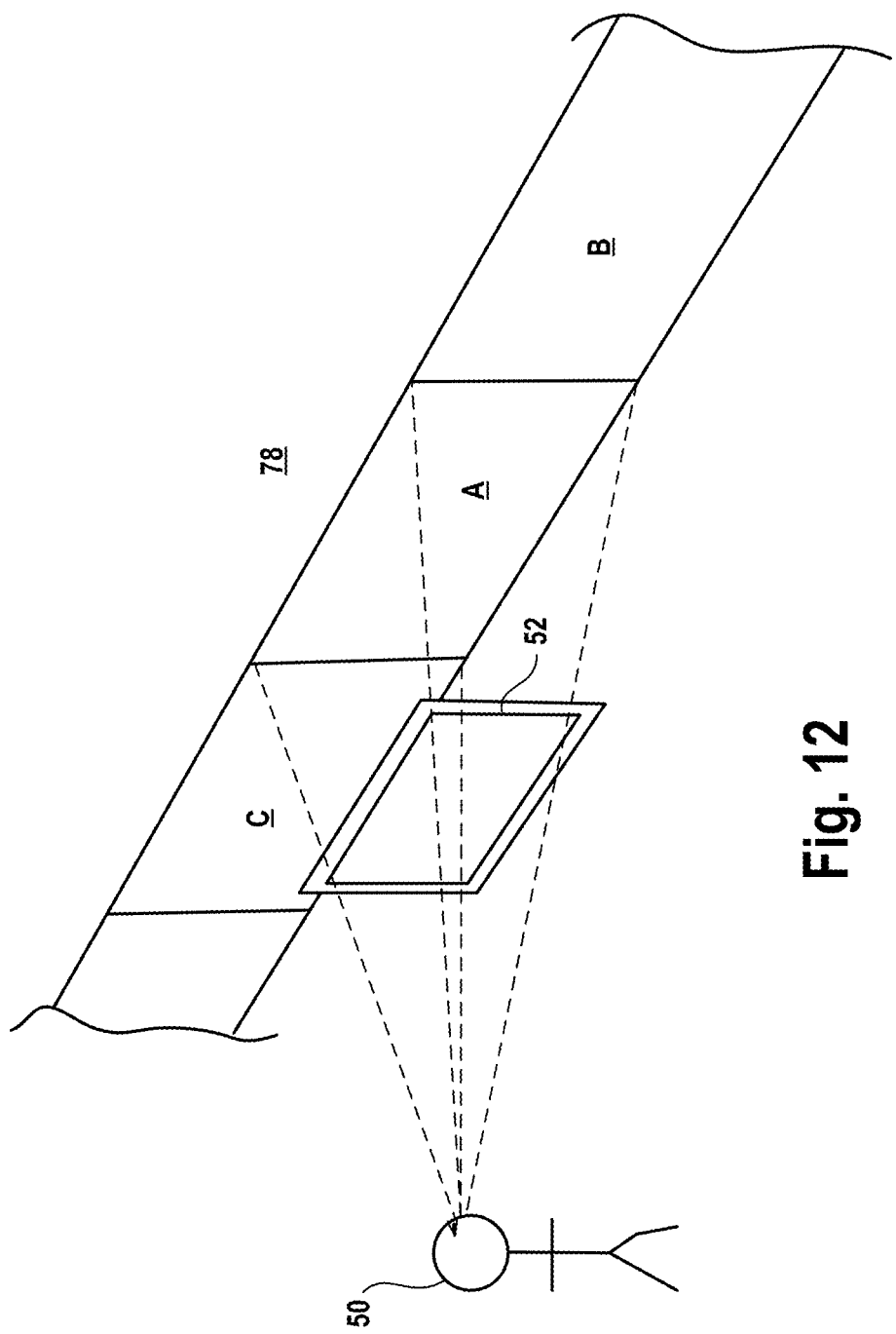
FIG. 12 illustrates a user viewing a plurality of render spaces in an information space through a display screen, in accordance with an embodiment of the invention.

FIG. 12 illustrates the user 50 viewing a plurality of render spaces in the information space 78 through the display screen 52. The render spaces are predefined spaces for presentation of content, and in the illustrated embodiment, render spaces A, B, and C are shown. As has been described, the user 50 experiences and effective viewing the render spaces as if viewing them through a window defined by the display screen 52. In the positioning of the user 50 as shown, the user 50 is able to view content that is presented on the render space A. It will be appreciated that if a user 50 were to move laterally to the left relative to the display screen 52, then his view of the information space 78 would be shifted so as to provide at least a partial view of the render space B while providing a diminished view of the render space A. Likewise, if the user 50 were to move laterally to the right relative to the display screen 52, then his view would include at least a portion of the render space see and a reduced amount of the render space A. In other words, the lateral movement of the user 50 relative to the display screen 52 will result in exposure of the adjacent render space from the lateral edge of the display screen 52 that is opposite the direction of the lateral movement of the user 50.

In the illustrated embodiment, the render spaces are shown as planar surface regions upon which content is assigned and rendered for presentation to the user. The render space A is oriented in the information space 78 such that its presentation on the display screen 52 yields an appearance of its planar surface being oriented substantially parallel to the planar surface defined by the display screen 52. Likewise, the render space B defines a planar content presentation surface positioned adjacent to the render space A, and is oriented substantially parallel to the render space A. Also, the render space C defines a planar surface in the information space 78, and is positioned on an opposite adjacent side of the render space A as that occupied by the render space B, and is also oriented so that its planar surface is substantially parallel with that of the render space A.

While several embodiments are described herein with reference to render spaces defined as planar surface regions for content presentation, it will be appreciated by those skilled in the art that in various embodiments a render space can be broadly defined as any region within the information space that is predefined for rendering of content. A render space may be a two-dimensional space as has been shown, but may also be a three-dimensional region within the information space. A render space can be a multidimensional surface upon which graphic content is presented. It should be appreciated that the various render spaces described herein are provided merely by way of example, and not by way of limitation.

Various types of content can be assigned to and rendered upon or within a render space. By way of example, content can include images, video, audio, television programs, navigation interfaces, webpages, a browser, animations, video games, multidimensional objects, and any other type of content which may be rendered on a render space.

Figure 13A:
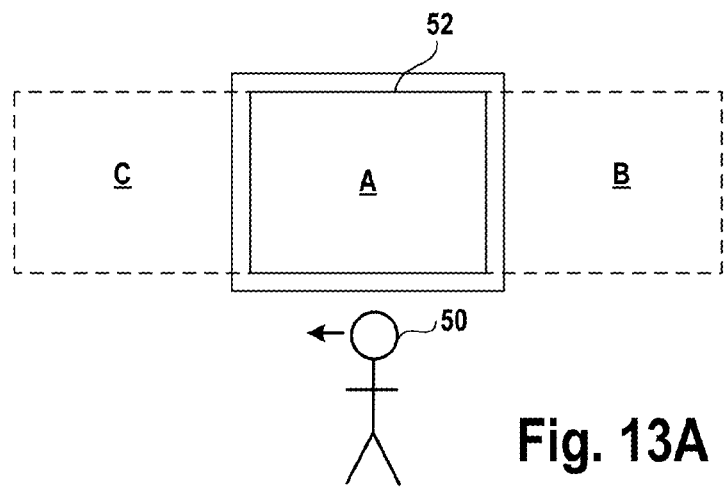
FIGS. 13A-C illustrate a user interacting with various render spaces, in accordance with an embodiment of the invention.
Figure 13B:
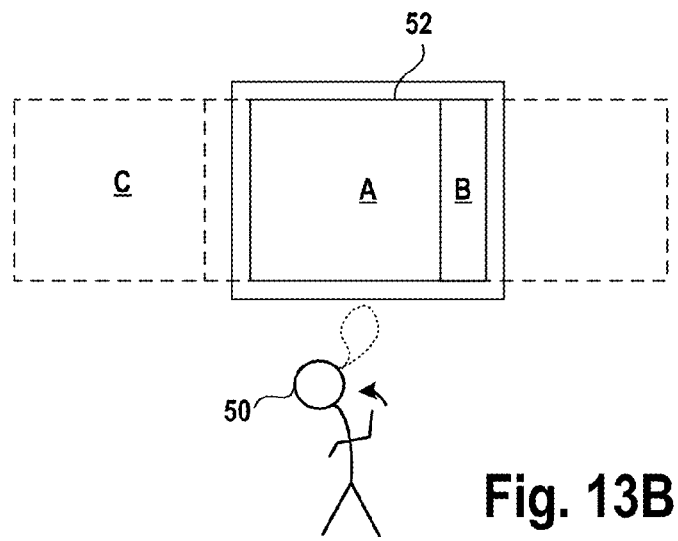
Figure 13C:
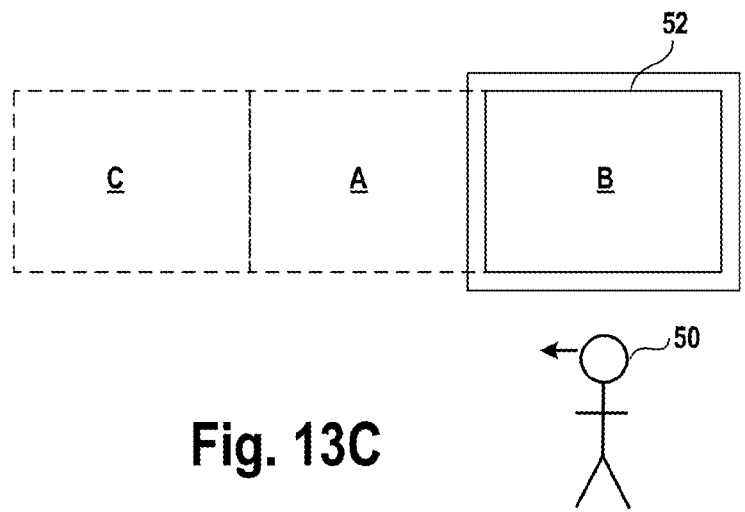

FIGS. 13A-C illustrate a user interacting with various render spaces, in accordance with an embodiment of the invention. At FIG. 13A, the user 50 is initially positioned in a central location in front of the display screen 52. At this location, the presentation of the users view of the information space is such that the entirety of the display screen 52 is occupied by the content presented on the render space A. The render space A can be characterized as occupying a primary position in the information space, such that it is primarily viewable when the user is situated at his initial or home location in the interactive environment. From the user's initial location, the user is shown moving laterally to the left relative to the display screen 52. At FIG. 13B, the user 50 has moved laterally to the left, and the users view of the information space presented on the display screen 52 has been updated to reflect the change in the user's position. Accordingly, a portion of the content on the adjacent render space B is exposed from the right edge of the display screen 52. When the portion of the content from the adjacent render space B is exposed, the user 50 may perform a gesture or issue a verbal command to cause the lineup of render spaces to be shifted. In the illustrated embodiment, the render spaces are shifted laterally to the left in response to the user's gesture or command, so that the render space B now occupies the primary position, and the user 50 is able to view the render space B in its entirety. In one embodiment, each of the render spaces has the same dimensions, so that the shifting of the render spaces results in the render space B occupying the location within the information space previously occupied by the render space A. It may be appreciated with reference to FIG. 13B that the shifting of the render spaces may initially produce a view such that the render space B is not fully presented on the display screen 52, as the user 50 remains to the left of his initial position. However, upon returning to his initial position, as shown at FIG. 13C, then the view of the render space B occupies the entirety of the display screen 52, as the render space B is not positioned in the primary position of the information space.

Figure 14A:
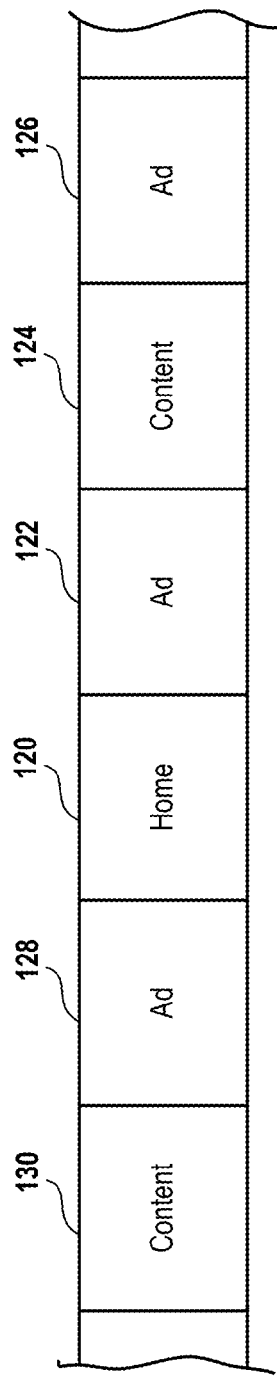
FIG. 14A illustrates an arrangement of various types of content in adjacent render spaces, in accordance with an embodiment of the invention.

FIG. 14A illustrates an arrangement of various types of content in adjacent render spaces, in accordance with an embodiment of the invention. In a render space 120, a home screen is presented from which a user may navigate to adjacent content presented in adjacent render spaces. In one embodiment, advertisements can be interspersed with nonadvertising content. Thus by way of example, and advertisement is presented in the render space 122 that is positioned on the right adjacent side of the render space 120 having be home screen. Adjacent to the right of the render space 122 is a render space 124 having nonadvertising content assigned to it. And to the right of the render space 124 is a render space 126 having another advertisement. Similarly, to the left of the home screen presented in the render space 120 are render spaces 128 and 130 which contain another advertisement and another nonadvertising content item, respectively.

Figure 14B:
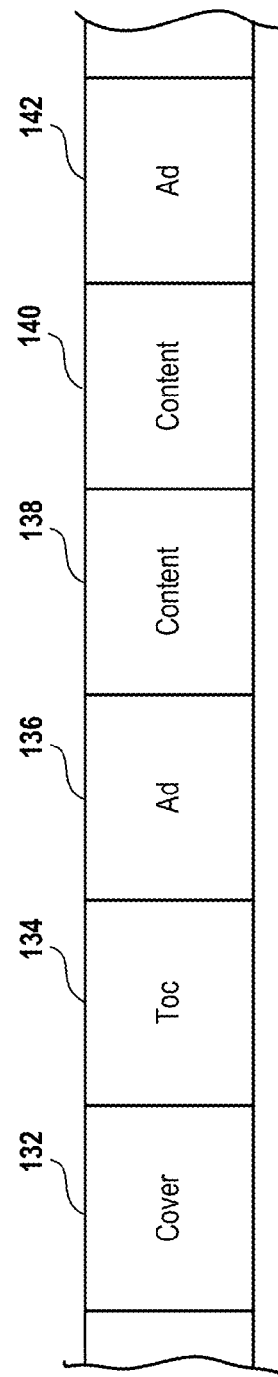
FIG. 14B illustrates an arrangement of various types of content in adjacent render spaces, in accordance with an embodiment of the invention.

FIG. 14B illustrates an arrangement of various types of content in adjacent render spaces, in accordance with an embodiment of the invention. The illustrated embodiment provides an arrangement of content for presenting a digital magazine or other digital publication, in accordance with embodiments of the invention. A render space 132 is designated for providing a cover content item. Adjacent to the cover is a render space 134 having a table of contents page.

Adjacent to the table of contents page is a render space 136 having an advertisement. Adjacent to the advertisement in the render space 136 are render spaces 138 and 140, each of which contain a nonadvertising content item. It will be appreciated that one or both of the nonadvertising content items assigned to the render spaces 138 and 140 can be an article, but may also be any of various other kinds of content items, such as an image or a video, by way of example and not limitation. Adjacent to the render space 140 is the render space 142 containing another advertisement.

Figure 14C:
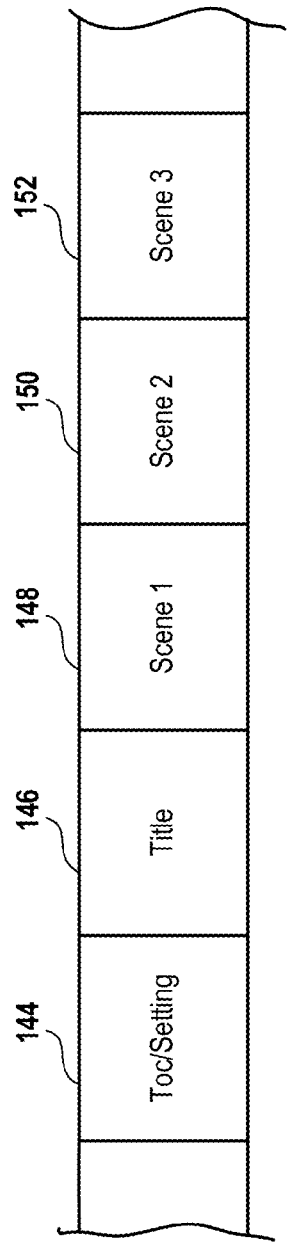
FIG. 14C illustrates another arrangement of content items in adjacent render spaces, in accordance with an embodiment of the invention.

FIG. 14C illustrates another arrangement of content items in adjacent render spaces, in accordance with an embodiment of the invention. In the illustrated embodiment, an arrangement is provided to facilitate viewing of video content such as a movie or television program. As shown, the render space 144 includes a page providing a table of contents or settings area adjacent to the render space 144 is render space 146 which presents a title scene of the video. Adjacent to the render space 146 having the title scene is render space 148 which presents a first scene of the video. In a similar manner adjacent render spaces 150 and 152 present a second scene and a third scene, respectively, of the video program. According to the arrangement provided for presenting the video, a user is able to view preceding and subsequent scenes by moving in the interactive environment relative to the display screen so as to bring interview adjacent render spaces having the preceding or subsequent scenes. This provides an intuitive interface for navigating within a video program, and also enables the user to preview various scenes of the video while watching a current scene. It will be appreciated that playback of a scene may be configured to initiate either when a given scene is at least partially exposed on the display screen based on a movement of the user, or may remain static when only partially exposed (e.g. displaying a representative image frame from the scene) until the scene is shifted to a primary position in the information space, so to be primarily rendered on the display screen when the user is located at their initial or home location within the interactive environment.

Figure 15:
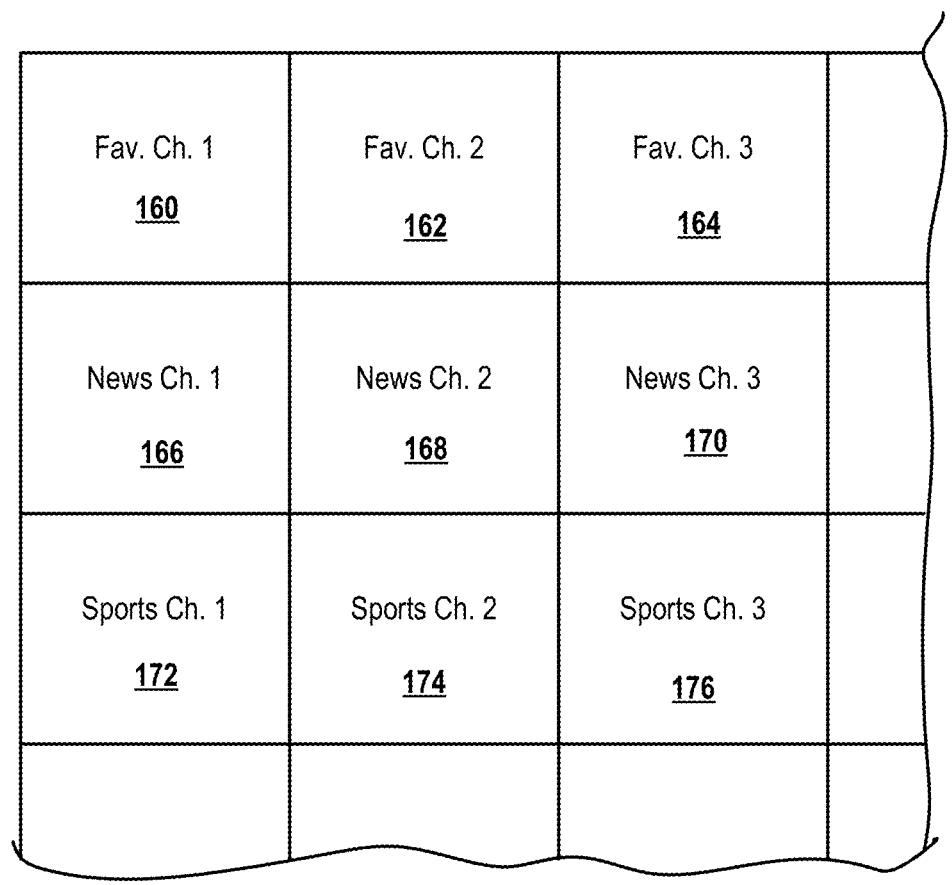
FIG. 15 illustrates a plurality of render spaces arranged in a contiguous fashion similar to tiles on a wall, in accordance with an embodiment of the invention.

Though several examples of horizontally aligned adjacent render spaces have been described, it will be appreciated by those skilled in the art that in various other embodiments, there may be any number of render spaces arranged in a variety of manners. For example, in one embodiment, render spaces can be arranged adjacent to each other both horizontally and vertically. By way of example, FIG. 15 illustrates a plurality of render spaces arranged in a contiguous fashion similar to tiles on a wall. As shown, the arrangement of render spaces provides an interface for viewing television channels. In one embodiment, each row of render spaces is configured to display a particular type of channels. Thus by way of example, the row defined by the render spaces 160, 162, and 164, may be configured to display a user's favorite channels, with each of the render spaces 160, 162, and 164 having an assigned favorite channel that is respectively presented therein. Another row defined by render spaces 166, 168, and 170 is configured to include various news channels, with each of the render spaces 166, 168, and 170 having a respective news channel presented therein. Similarly, the row of render spaces defined by the render spaces 172, 174, and 176 is designated to display various sports channels, with each of the render spaces 172, 174, and 176 having a respective sports channel presented therein. The embodiment dust described provides for a navigational interface by which a user may change channels and move between groups of channels in an intuitive fashion. When a user is viewing a particular channel in one of the render spaces, the viewer may have access to view a portion of a channel presented in an adjacent render space by moving relative to the display screen, typically either in a lateral fashion or radially towards the display screen. It will be appreciated that when the user moves laterally to one side then he is able to view the channel that is presented in an adjacent render space on the opposite side of the currently viewed render space. Whereas if the user moves toward the display while watching a given channel in a specific render space, then the user is able to view portions of the surrounding render spaces and thereby preview portions of the channel content being presented on those render spaces. In this manner, the user is an intuitive mechanism for previewing another channel while watching a current channel, that is based on the users' movements relative to the display screen upon which channel content is presented.

Several embodiments of coplanar adjacent render spaces have been thus described. However in various embodiments, render spaces may or may not be coplanar with each other and may or may not be parallel each other. For example, FIG. 16 illustrates a plurality of render spaces wherein some of the render spaces are oriented at an angle relative to others of the render spaces. As shown, render spaces A, B, and C are arranged in a horizontally adjacent and coplanar configuration. The plane defined by these render spaces in the information space is such that when the user 50 views them through the display screen 52, the render spaces A, B, and C are oriented so that their planar surfaces appear to be substantially parallel with the plane of the display screen 52. On the other hand, render spaces D, E, and F are arranged in an adjacent and coplanar configuration, but are not parallel with the render spaces A, B, and C. As shown in the illustrated embodiment, the render spaces D, E, and F are positioned below the render spaces A, B, and C, and angled towards the display screen 52.

FIG. 17 illustrates an interaction with render spaces as defined in the embodiment of FIG. 16. In the scene 180, the user 50 is initially located at a substantially centered or home position in front of the display screen 52. At this location, the user's view of the information space 78 is such that the content presented on the render space A is shown occupying the entirety of the display screen 52. As the user 50 moves towards the display screen 52, his view of the information space 78 is adjusted in accordance with his change in position. In the illustrated scene 182 it can be seen that the user's view of the information space 78 as presented on the display screen 52 has expanded to include adjacent render spaces. As can be seen, the area of the display screen occupied by the presentation of the render space A has diminished, with portions of the render spaces B, C, D, E, and F, being progressively displayed from edges of the display screen 52. As has been noted, the render spaces A, B, and C are oriented within the information space 78 such that their presentation on the display screen 52 provides an appearance of these render spaces being substantially parallel with the plane of the display screen 52. Whereas, a render spaces D, E, and F are oriented in the information space 78 so that their presentation on the display screen 52 provides an appearance of these render spaces being oriented on a plane that is substantially not parallel with that of the display screen 52, and by extension, that of the render spaces A, B, and C. As shown in the scene 182, a perspective projection of the render space D is presented on the display screen 52, thereby providing an appearance of the render space D being angled from a bottom edge of the render space A towards the display screen 52. The overall effect provides a sense of depth as the user views the render spaces existing in the information space 78 through the display screen 52.

In one embodiment, the user 50 may perform a gesture or provide a verbal command to trigger swapping of the positions of two render spaces. In the illustrated embodiment, the user 50 performs a gesture while viewing at least a portion of the render space D, as it is made viewable in response to the user's movement towards the display screen. In response to detection of the user's gesture, as shown at scene 184, the positions of the render spaces A and D have been swapped, so that render space D is now presented in the primary position previously occupied by the render space A so as to provide an appearance of being substantially parallel with the plane of the display screen, and render space A is now oriented along the angled plane of spaces E and F. At scene 186, the user 50 returns to his initial location, and the view of the information space 78 is adjusted accordingly, so as to show the content of the render space D occupying the display screen 52.

In another related embodiment, a similar effect may be achieved by swapping the assignment of content between render spaces, as opposed to swapping render spaces themselves. The ultimate effect is similar from a user perspective, as content in one region is moved to another region, and replaced with content originally presented in that region.

Figure 18:
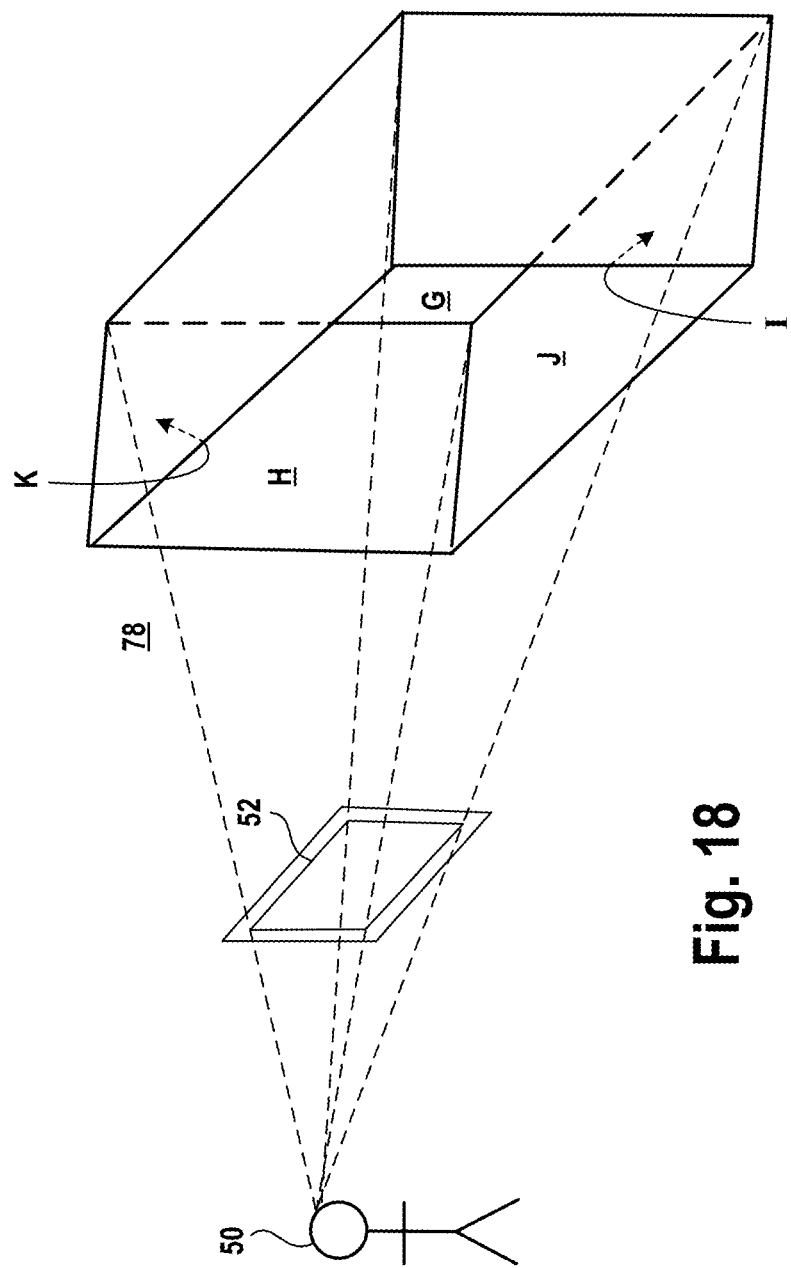
FIG. 18 illustrates a plurality of render spaces arranged to have a configuration similar to that of a stage, in accordance with an embodiment of the invention.

FIG. 18 illustrates a plurality of render spaces arranged to have a configuration similar to that of a stage, in accordance with an embodiment of the invention. As shown, the render space G occupies a primary position, and is oriented in the information space 78 so as to be substantially parallel with the plane of the display screen 52 when presented on the display screen 52. Render spaces H and I are horizontally adjacent to and oriented on opposite sides of the render space G, but have an angled configuration towards the display screen 52. The render spaces J and K are vertically adjacent to and oriented on opposite sides of the render space G, and also have an angled configuration towards the display screen 52. Various pieces of content can be presented on the render spaces G, H, I, J, and K. It will be appreciated that content presented on the render spaces H, I, J, and K will be distorted and adjusted in response to user movements so as to provide the appearance of the content being oriented at an angle relative to the display.

Figure 19:
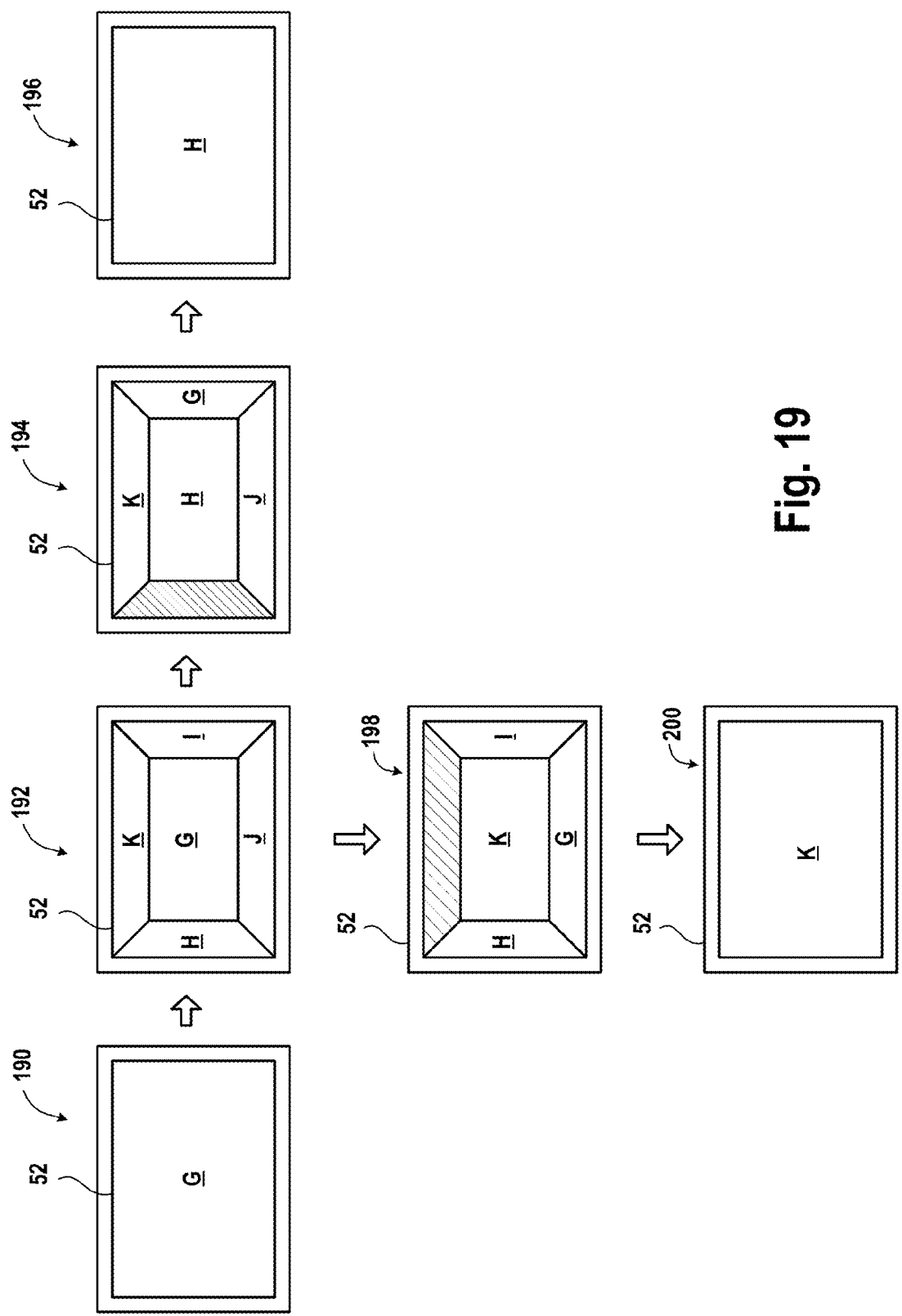
FIG. 19 illustrates an interactive sequence with a render space configuration, as shown on a display screen, in accordance with an embodiment of the invention.

FIG. 19 illustrates an interactive sequence with the render space configuration of the embodiment of FIG. 18, as shown on the display screen 52, in accordance with an embodiment of the invention. At an initial scene 190, the user (not shown) is positioned at an initial home location in front of the display screen 52. When at the home location, the user sees a view of the render space G on the display screen 52. As the user approaches the display screen 52 from the initial home location, the view presented on the display screen 52 is adjusted in accordance with the user's movement. As shown at scene 192, the result is that portions of the render spaces H, I, J, and K which are adjacent to the render space G are shown in border regions of the display, and the presentation of the render space G is reduced in size. The render spaces H, I, J, and K are presented as perspective projections to provide the appearance to the user of their respective planar surfaces being angled relative to the plane of the display screen 52, whereas that of the render space G is substantially parallel with the plane of the display screen.

In one embodiment, the user is able to effect rotation of the render spaces in the information space by performing a gesture or verbal command. For example, if the user wishes to view the content presented on the render space H, then in response to detecting an appropriate gesture, the stage-like configuration of the render spaces is horizontally rotated about a vertical axis so as to bring into primary view the render space H, as shown at scene 194. This can provide an effect of the user interacting "inside" of the stage-like configuration of the render spaces. When the user moves away from the display screen 52 to a sufficient extent, then the render space H occupies the entirety of the display screen 52, as shown at scene 196.

In a related manner, the user can also perform a gesture or issue a verbal command, which effects vertical rotation of the render space configuration about a horizontal axis. For example, in response to detecting such a gesture, at scene 198, the render space K, which previously was located in a top position, is brought into the primary position facing the display screen 52. Accordingly, the render space G has moved down to a lower position. And when the user moves a sufficient distance away from the display screen 52, then the render space K is presented occupying the entirety of the display screen 52, as is shown at the scene 200.

Figure 20:
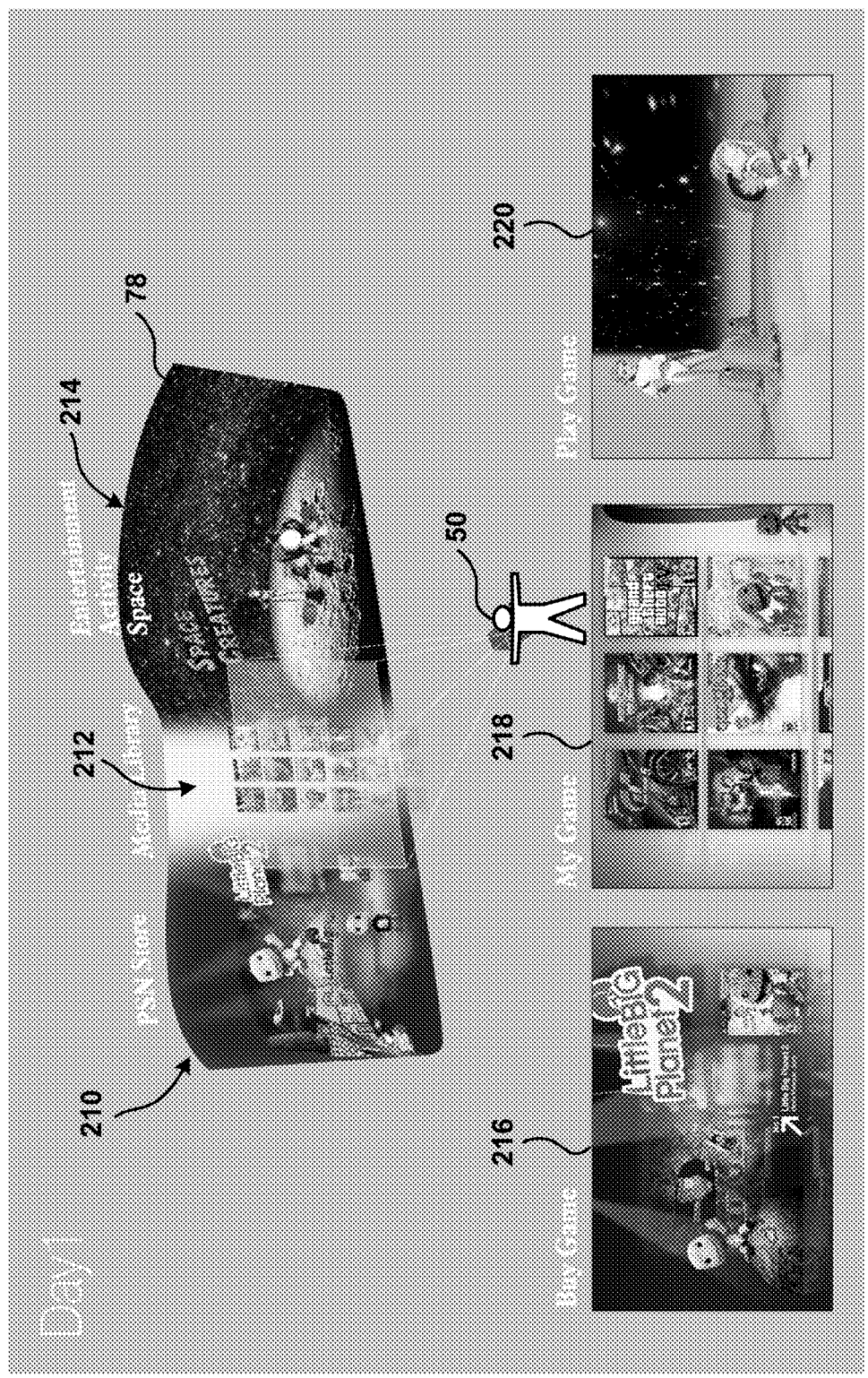
FIG. 20 illustrates a plurality of render spaces in an information space, in accordance with an embodiment of the invention.

FIG. 20 illustrates a plurality of render spaces in an information space, in accordance with an embodiment of the invention. As shown, the information space 78 is defined to include render spaces 210, 212, and 214. The render space 210 includes a store for purchasing digital content, such as games, movies, music, etc. The adjacent render space 212 presents a media library, from which the user may access media that may be stored in a digital library or otherwise made accessible to the user. Adjacent to the render space 212 is an entertainment activity space defined in the render space 214. In one example, the entertainment activity space is defined for playing a video game. The user may view and access the various render spaces in accordance with the principles described herein. By way of example, representative screenshots are shown of content displayed in the various render spaces when viewed by the user 50 on the display screen. Screenshot 216 illustrates a view of the render space 210 having the digital content store. Screen show 218 illustrates a view of the render space 212 having the media library, in which various video game titles are shown. Screenshot 220 illustrates a view of the render space 214, which is an entertainment activity space, in which the user may play a game in accordance with one embodiment.

Figure 21:
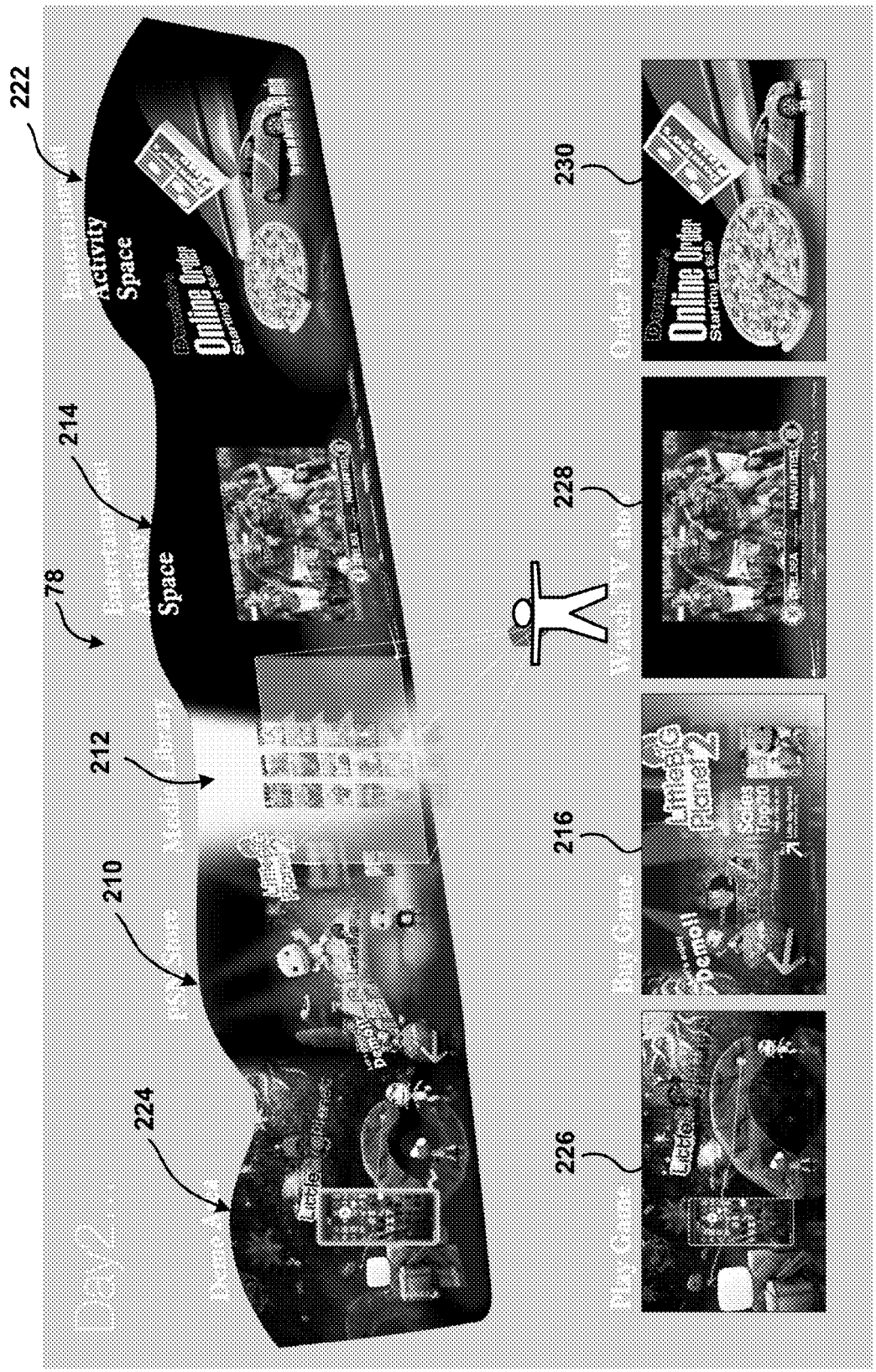
FIG. 21 illustrates a plurality of render spaces in an information space, in accordance with an embodiment of the invention.

In various embodiments, the particular content displayed in a given render space, and the number of available render spaces and their configuration may dynamically change over time. For example, FIG. 20 may represent available render spaces in the information space 78 on a given day, whereas on a subsequent day, additional render spaces may be made available to the user, as is shown at FIG. 21. As shown, in addition to render spaces 210, 212, and 214, render spaces 222 and 224 are now made available for content presentation and viewing. In the illustrated embodiment, the render space 222 is defined for entertainment activity, whereas the render space 224 defines a game demo area. Also, the render space 214 has changed content to now display a sporting event, rather than the previously included video game. Accordingly with the updated render spaces in the information space 78, a screenshot 226 shows a view of the render space 224 shows the video game demo which the user may access and play from this render space. The screenshot 228 shows a view of the render space 214, now displaying a television broadcast of a sports event. The screenshot 230 shows a view of the render space 222, which is defined as an entertainment activity space, and includes an advertisement for ordering food.

Figure 22:
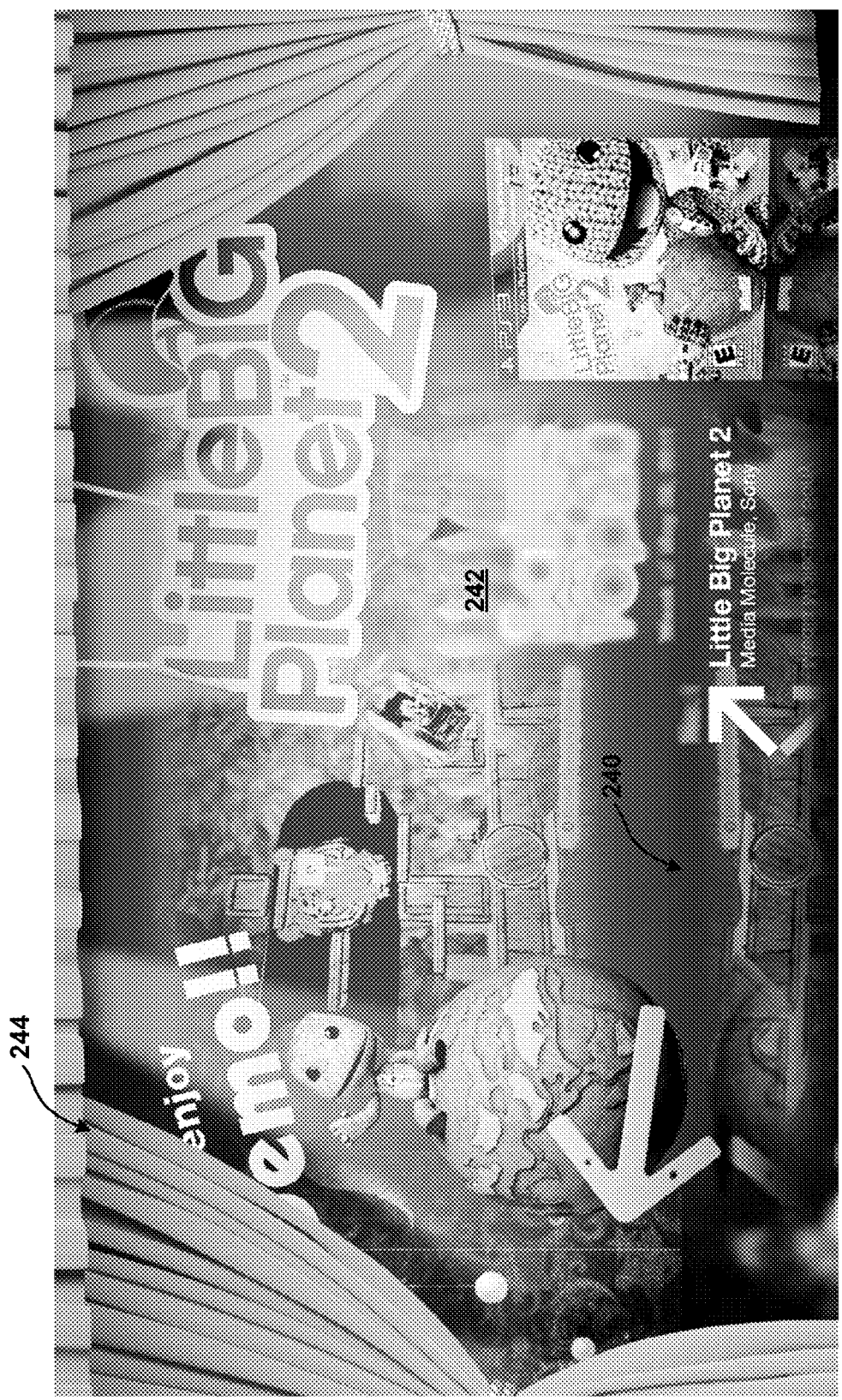
FIG. 22 illustrates a screen view of a render space, in accordance with an embodiment of the invention.

FIG. 22 illustrates a screen view of a render space, in accordance with an embodiment of the invention. The render space is itself a three-dimensional environment in which three-dimensional objects are present. In the illustrated embodiment, the render space is configured to have an appearance like a stage, having by way of example, a floor 240, and curtains 244, and defining a interior region 242 of the stage in which 3D objects are rendered. In accordance with the principles for interactivity described herein, as the user moves in relation to the display screen, his view of the render space as presented on the display screen is updated to provide an appearance of the render space persistently occupying the real space behind the display screen. Thus, the user experiences a sense of depth looking "into" the display screen. By way of example in the illustrated embodiment, if the user moves the right, the user will be able to see regions of the render space which are situated behind the curtains 244, and the view of the render space displayed on the display screen is updated to provide this effect.

Figure 23:
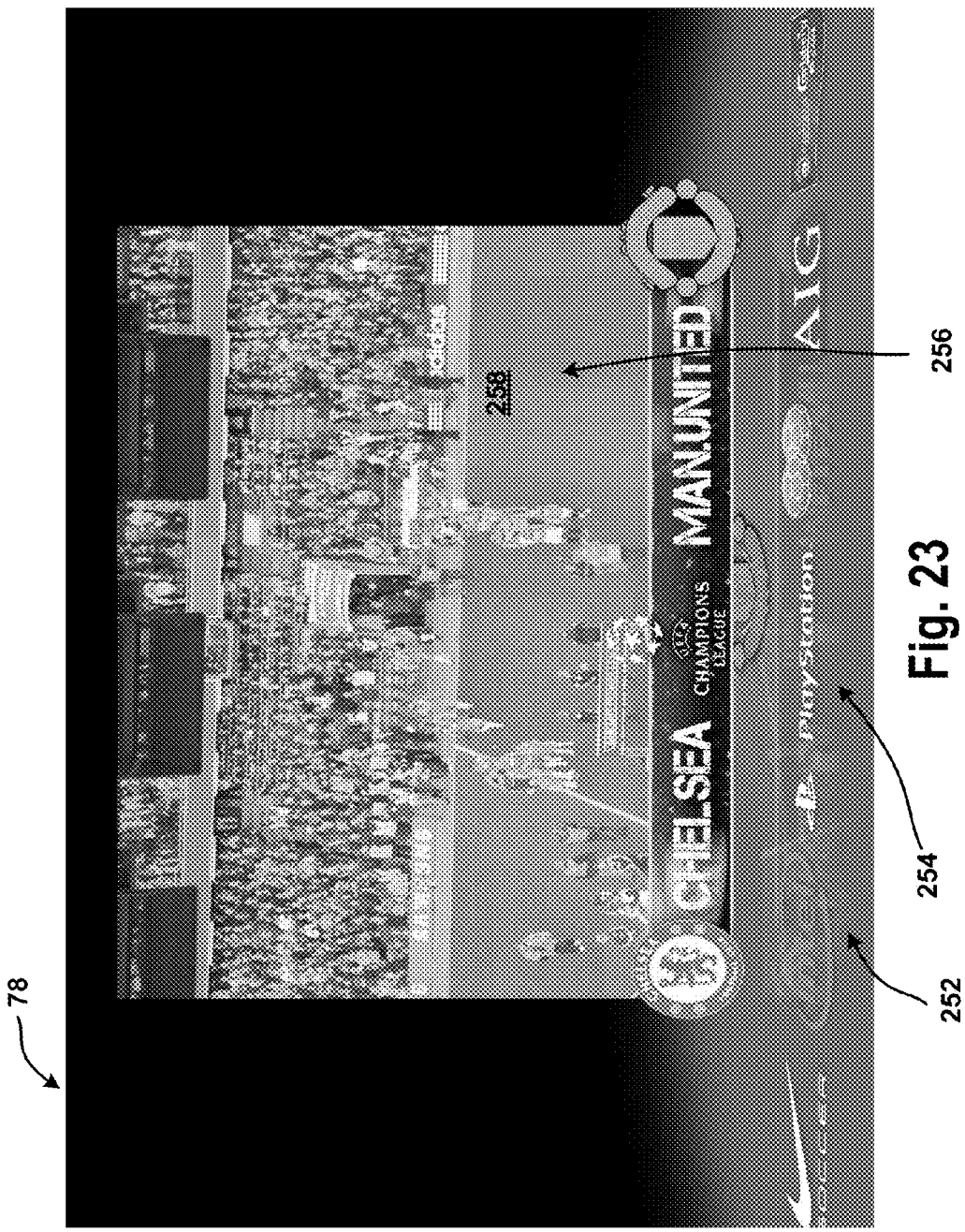
FIG. 23 illustrates a screen view of an information space, including various render spaces displaying various content, in accordance with an embodiment of the invention.

FIG. 23 illustrates a screen view of the information space 78, including various render spaces displaying various content, in accordance with an embodiment of the invention. A render space 252 is defined in the information space 78, and is oriented at an angle relative to the display screen. A render space 256 is also defined that is oriented substantially parallel with the display screen. A sporting event 258 is being rendered on the render space 256. The render space 252 defines a floor region on which various content items can be displayed. By way of example, logos of sponsors of the sporting event can be displayed on the render space 252. In one embodiment, the sponsor logos may be selectable by the user, and when selected trigger navigation to a website of the sponsor or other content related to the sponsor or the sporting event. The presentation of the render spaces to the user on the display screen is determined based on the location of the user, in accordance with principles described herein. Thus, the presentation based on the user's movements provides an appearance of the content occupying the real space behind the display, with portions of the render space 252 being exposed from the bottom side of the display screen when the user approaches the display screen, for example.

Figure 24:
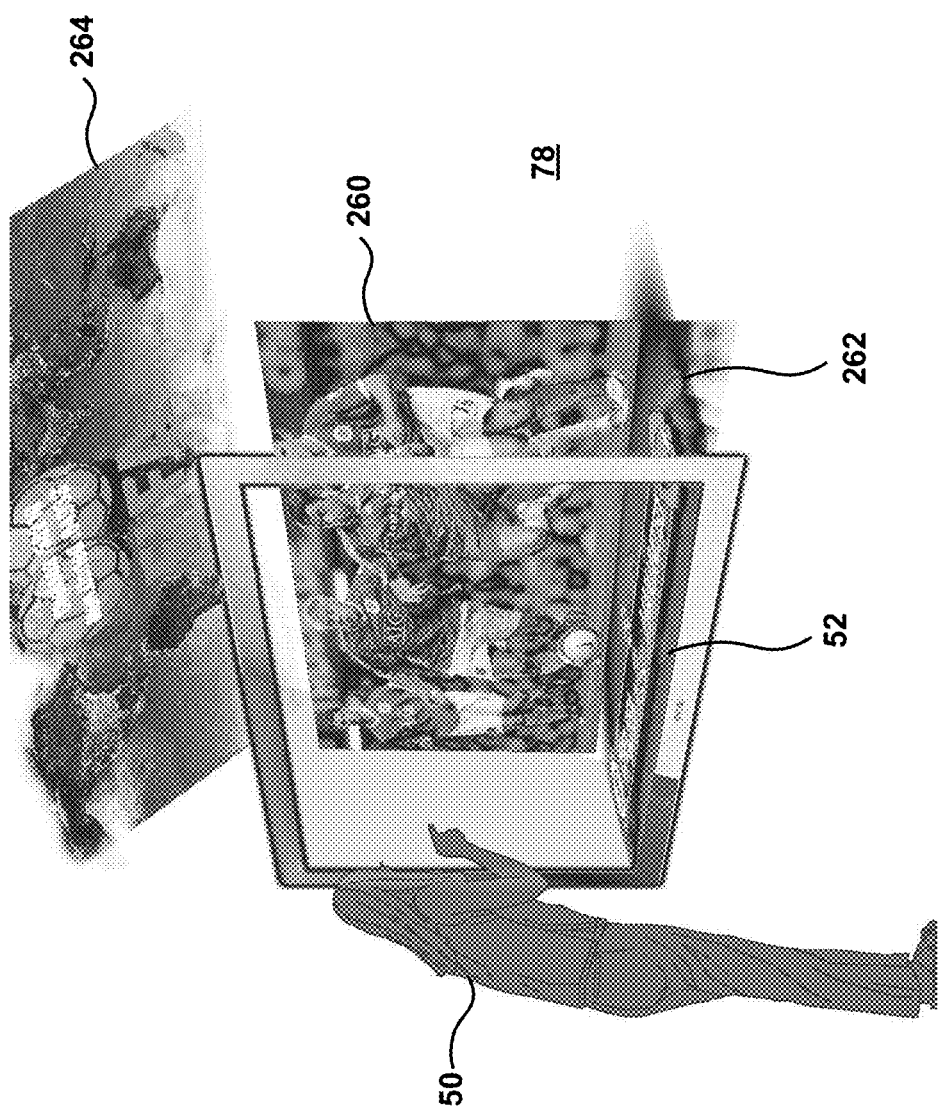
FIG. 24 conceptually illustrates a user viewing content presented on render spaces in an information space through a display screen, in accordance with an embodiment of the invention.

FIG. 24 conceptually illustrates the user 50 viewing content presented on render spaces in the information space 78 through the display screen 52. In the illustrated embodiment, a primary render space 260 defines a planar surface oriented substantially parallel with the plane of the display screen 52. A sports game is being displayed on the render space 260. A secondary render space 262 defines a planar surface oriented at an angle relative to the primary render space 260 and intersecting the primary render space 260. The secondary render space 262 is located in a lower region of the information space 78, and is viewable by the user 50 looking down into the display screen 52. Another secondary render space 264 is provided above the primary render space 260, and angled towards the user for ease of viewing content presented on the secondary render space 264. Each of the secondary render spaces 262 and 264 can be configured to display content relating to that shown on the primary render space 260. In this manner, the user 50 is given access to additional information relating to primary content in a manner based upon the user's location and movements.

Figure 25:
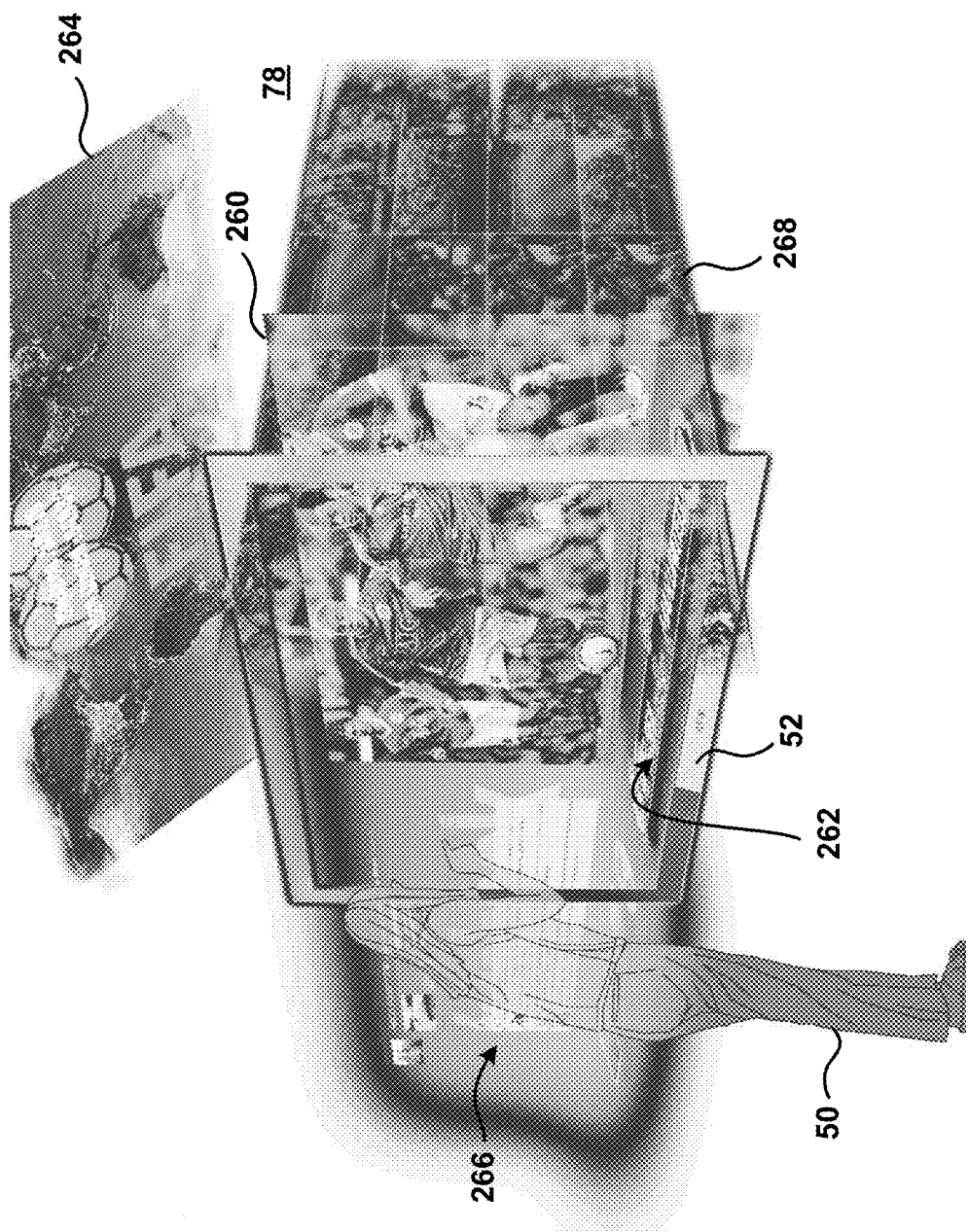
FIG. 25 conceptually illustrates a user viewing an information space through a display screen, in accordance with an embodiment of the invention.

FIG. 25 conceptually illustrates the user 50 viewing the information space 78 through the display screen 52, in accordance with an embodiment of the invention. In addition to the render spaces described with reference to the embodiment of FIG. 24, additional render spaces 266 and 268 are shown in the information space 78. The render space 266 is substantially coplanar with and positioned horizontally adjacent to the primary render space 260. In the illustrated embodiment, the render space 266 is populated with a web page, such as a social networking web page of the user 50. The render space 268 is oriented in the information space 78 so as to intersect the right edge of the primary render space 260. It will be appreciated that by moving laterally to the right or left relative to the display screen 52, the user 50 will be able to view more or less of the render space 266, respectively, and less or more of the render space 268, respectively. The overall effect provides an immersive experience for the user 50, as if the render spaces existed in the real space occupied by the user.

Figure 26:
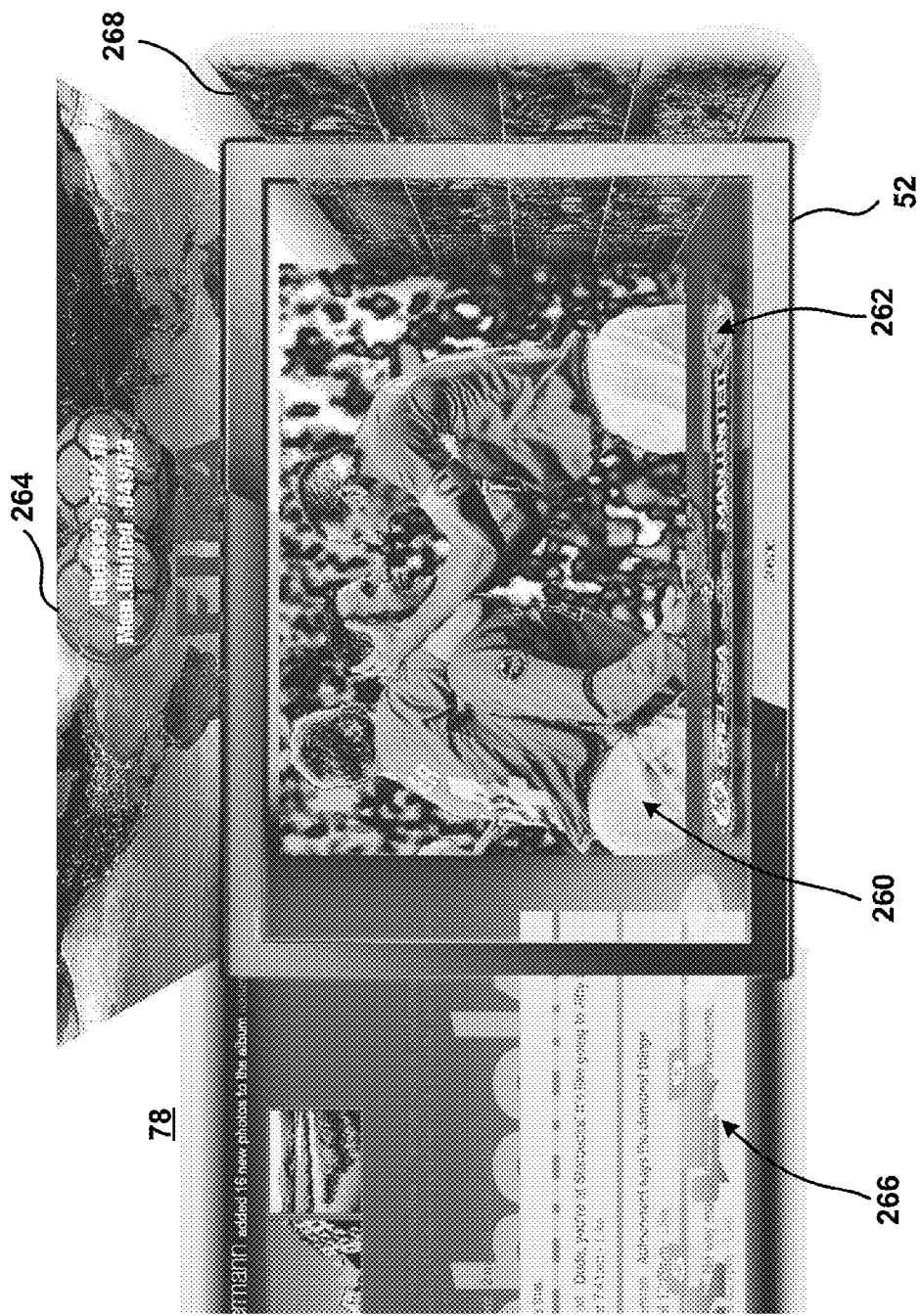
FIG. 26 illustrates a front view of a display screen through which a user is able to view an information space, in accordance with an embodiment of the invention.

FIG. 26 illustrates a front view of the display screen 52 through which the user is able to view the information space 78, in accordance with the embodiment of FIG. 25. As can be seen, the various render spaces 260, 262, 264, 266, and 268 are presented through the display screen 52 in a manner which provides a sense of depth of the information space 78. The render spaces are presented as perspective projections on the display screen 52 relative to the user, based on the location of the user so as to provide an appearance of the render spaces having substantially persistent locations in the real space occupied by both of the user and the display screen 52.

Figure 27:
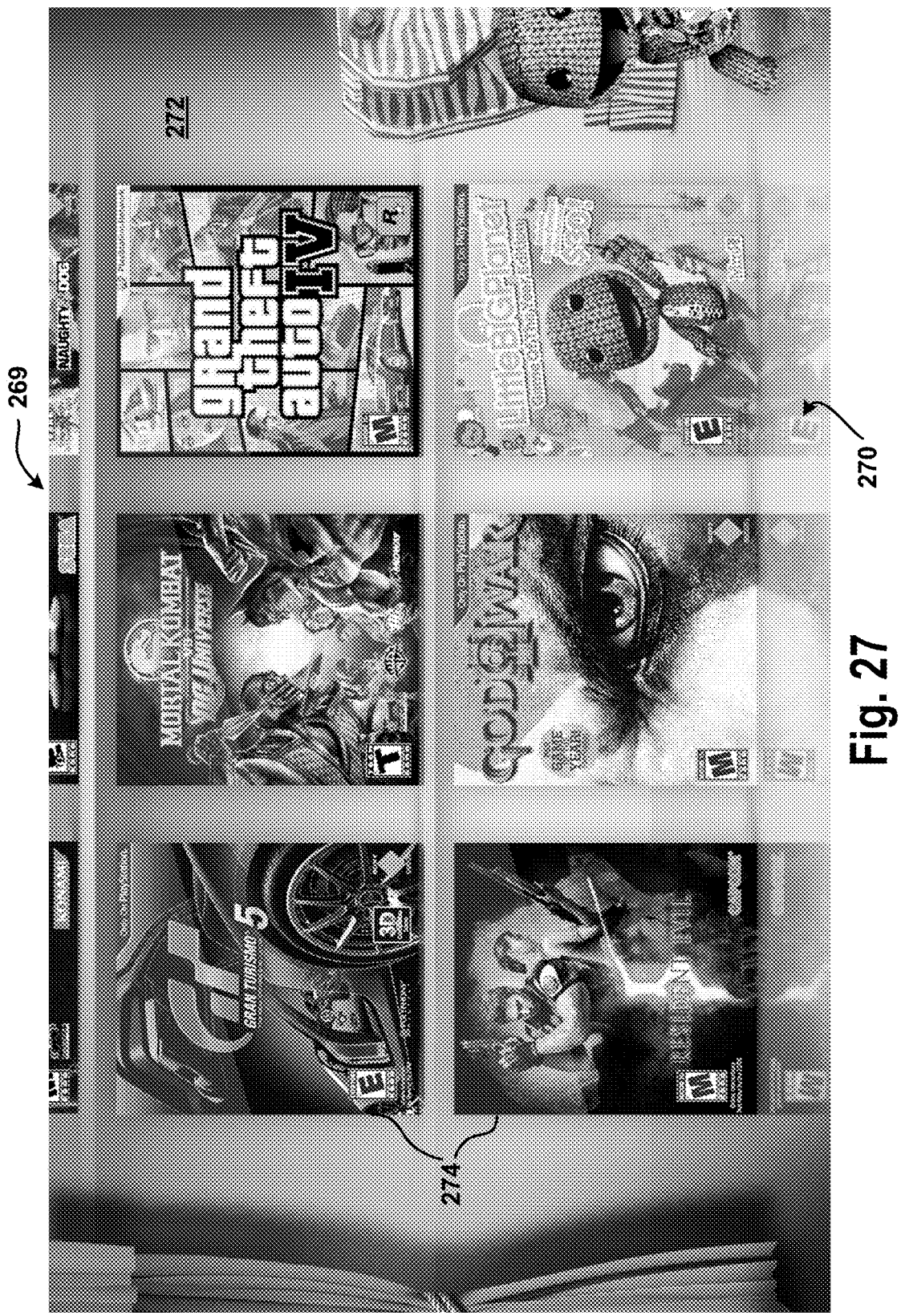
FIG. 27 illustrates a screen view of a render space having a stage-like configuration, in accordance with an embodiment of the invention.

FIG. 27 illustrates a screen view of a render space 269 having a stage-like configuration, in accordance with an embodiment of the invention. As shown, the render space 269 defines a floor region 270, and a back wall 272. Various video game titles are shown in the interior region of the render space.

Figure 28:
FIG. 28 illustrates a navigation menu for navigating to various render spaces, in accordance with an embodiment of the invention.

FIG. 28 illustrates a navigation menu for navigating to various render spaces, in accordance with an embodiment of the invention. As shown, a navigation menu 280 is displayed atop the screen view of the render space 269. The navigation menu 280 includes various selectable panels for navigating to various associated render spaces. In this way, the user is able to view the arrangement of render spaces and their relationship to one another from a high level, and so navigate quickly to a render space that is perhaps not easily found or navigated to otherwise.

In some cases, a user may not be aware that additional content is accessible when viewing the information space through the display screen. Therefore, it may be useful to provide the user with a hint or indicator that content beyond that which they are currently viewing is available. For example, it may be the case that adjacent render spaces to the primary render space are available during some time periods but not during others. For example, content in an adjacent render space may be related to a particular program or scene, and may therefore become available when the program or scene is currently being displayed. The user might not be aware that such additional content is available. Therefore in some embodiments, notifications can be provided to the user to inform him/her that extra content is accessible in the information space.

Figure 29:
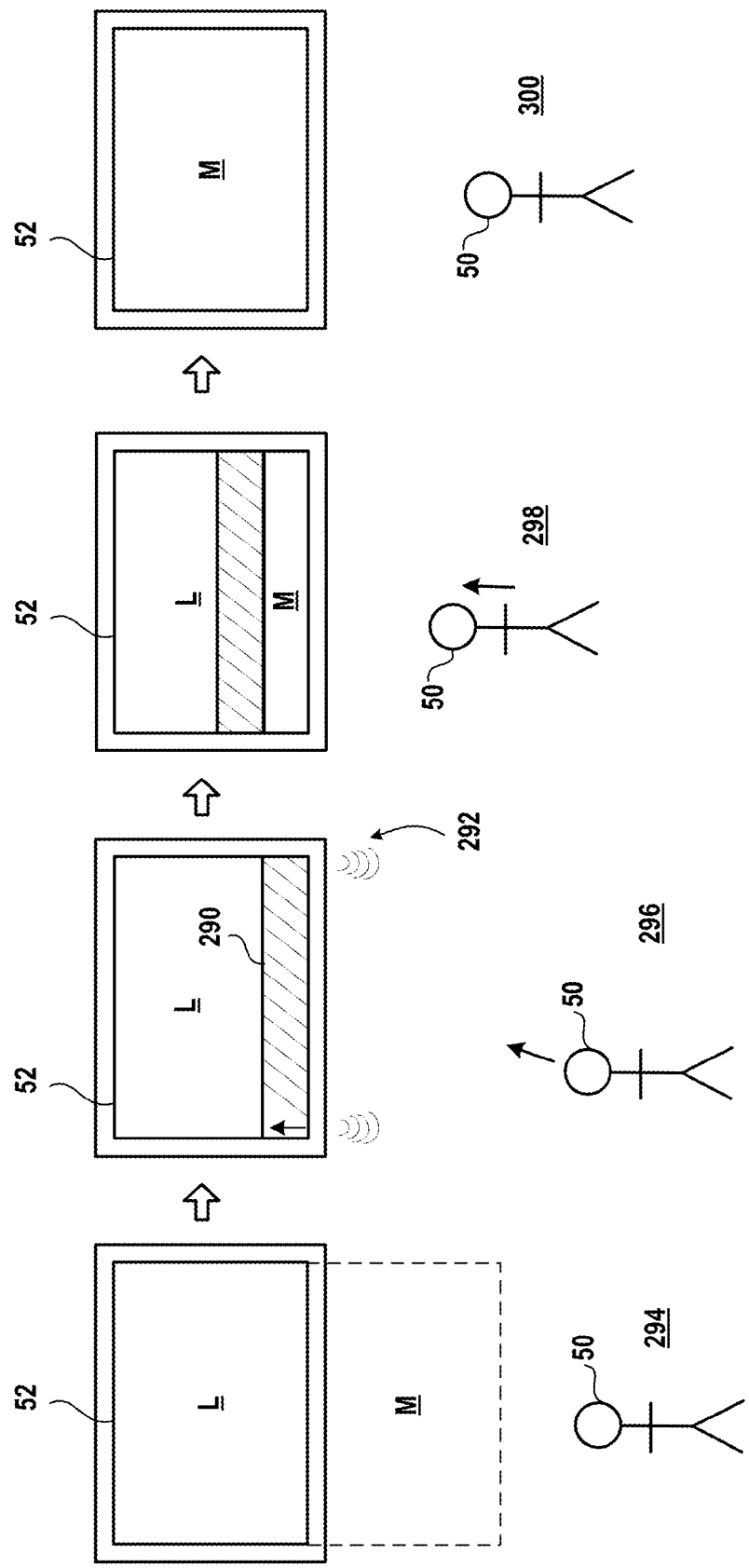
FIG. 29 illustrates a sequence wherein a user is prompted to view additional content in an information space by a notification, in accordance with an embodiment of the invention.

FIG. 29 illustrates a sequence wherein a user is prompted to view additional content in the information space by a notification, in accordance with an embodiment of the invention. At the scene 294, the user 50 is situated at an initial location in front of the display screen 52, viewing content from a render space L. An adjacent render space M contains additional content, but is not visible in the user's current view displayed on the display screen 52. The user may not be aware of the existence of the content in the render space M. Therefore, at scene 296, a notification is drawn onscreen in a lower region 290 of the display screen. The notification may describe the content of the render space M to varying degrees, or may simply provide a visual cue indicating its presence. The placement of the notification in the lower region may indicate the presence of the render space M below the render space L. Additionally, an audio signal 292 can be played which may also alert the user to the presence of the render space M and its availability for viewing.

In response to viewing the notification 290, the user 50 moves towards the display screen 52 so as to be able to look "down into" the display screen to see the additional content of the render space M. As shown at scene 298, when the user approaches the display screen 52, a portion of the content associated with the render space M becomes visible, as the view of the information space is updated in accordance with the user's movement towards the display. When the portion of the content is visible, the user may perform a gesture to move the render space M up so as to occupy the primary position for viewing in the information space, so that when the user returns to his initial position, as shown at scene 300, the content associated with the render space M is shown occupying the display screen 52.

Figure 30:
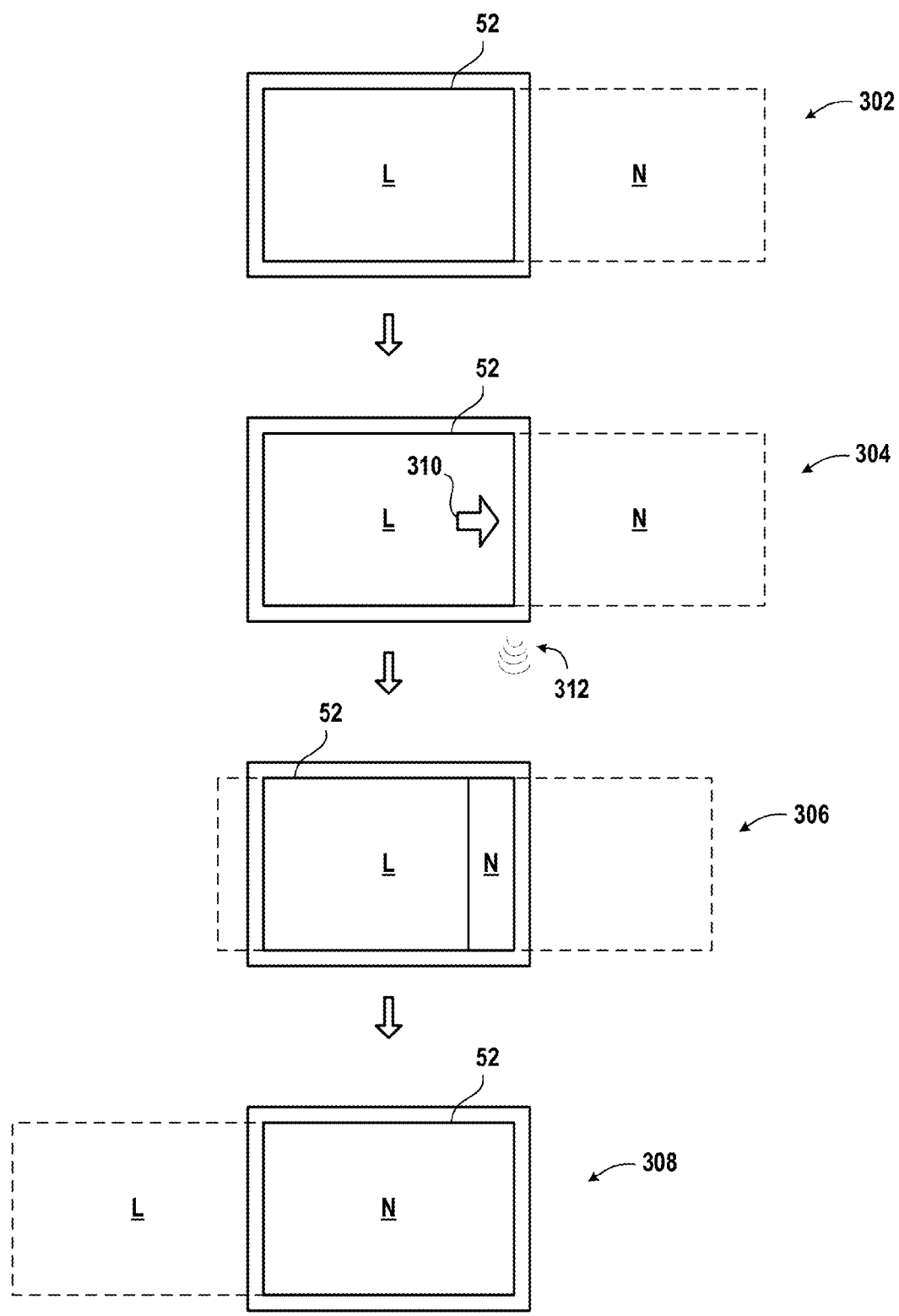
FIG. 30 illustrates a sequence showing a notification of the availability of content in a horizontally adjacent render space, in accordance with an embodiment of the invention.

FIG. 30 illustrates a sequence showing a notification of the availability of content in a horizontally adjacent render space, in accordance with an embodiment of the invention. At scene 302, the user (not shown) is positioned at an initial location in front of the display screen. Based on this initial location, the render space L is shown on the display screen 52. However, there is also additional content available in the horizontally adjacent render space N, which is not currently shown. At scene 304, a notification is provided to the user in the form of an arrow 310 displayed on the display screen 52, pointing in the direction of the render space N. Optionally, an audio cue 312 may also be provided. In response to the visual or audio notification, the user may move in a lateral direction so as to be able to view the render space N. In the illustrated embodiment, the user moves to the left, thereby exposing the content in the render space N from the right edge of the display screen 52, as shown at scene 306. The user may provide a gesture or other input command (e.g. verbal command, controller input, etc.) to move the render space N into the primary viewing position, so that when the user returns to his initial location, the render space N is presented on the display screen 52, as shown at scene 308.

Embodiments thus described have detailed various ways in which visual presentation of content is handled. However, content such as video content and the like may have associated audio content. The selection and playback of audio content can also be adjusted in various ways based on the location and movement of the user, and may be based at least in part on the changes made to the user's view of the information space.

Figure 31:
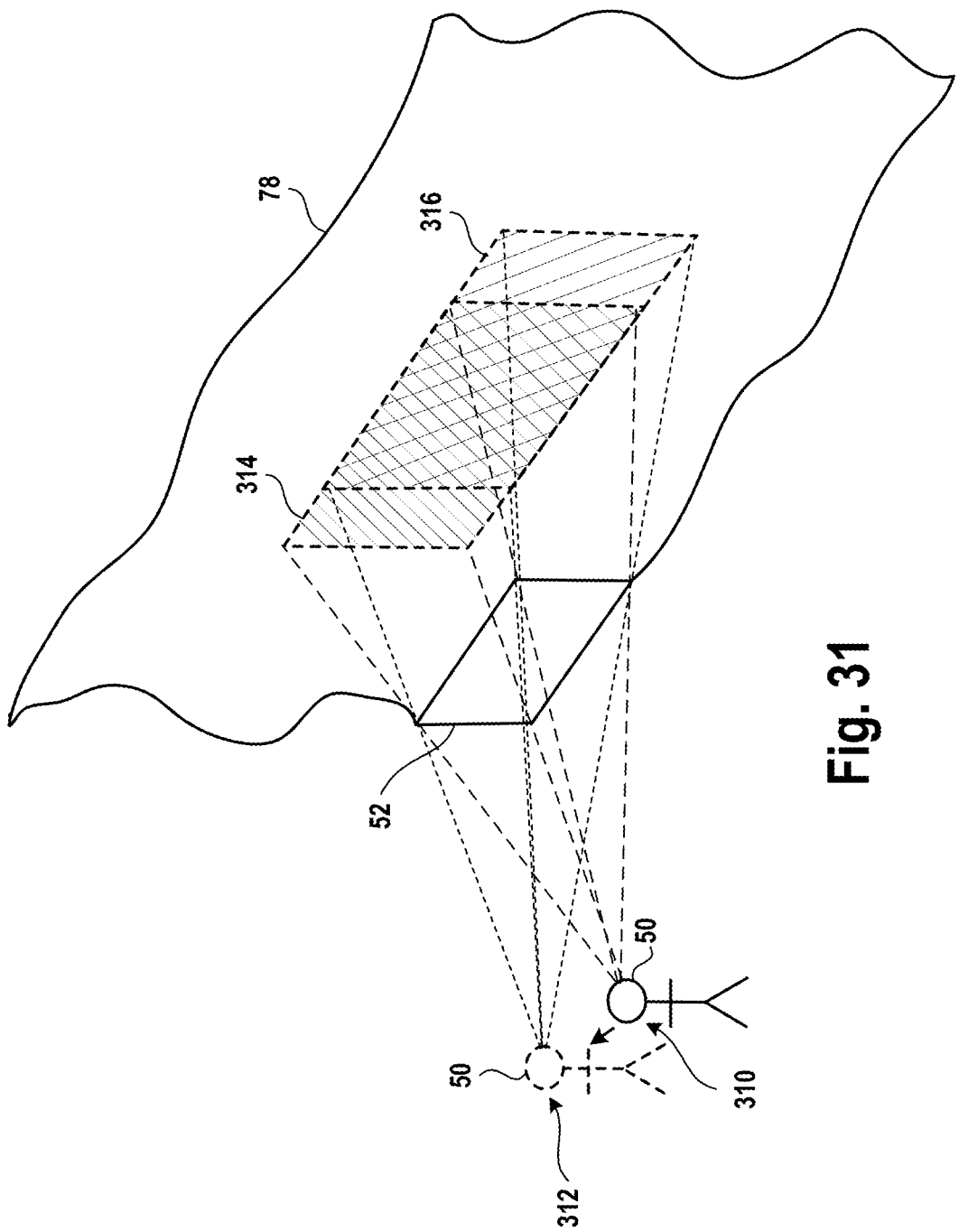
FIG. 31 illustrates a user viewing content in an information space through a display screen, in accordance with an embodiment of the invention.

FIG. 31 illustrates the user 50 viewing content in the information space 78 through the display screen 52. When the user 50 is positioned at location 310, the user 50 is provided with a view 314 of the information space 78 rendered on the display screen 52. When the user 50 moves to a new location 312, then the user 50 is provided with an updated view 316 of the information space 78. As has been described, the effect of the updated view is so as to provide to the user a sense of viewing the information space 78 through a window defined by the display screen 52. In one embodiment, the audio playback is also adjusted depending upon the view of the information space 78 provided to the user 50. By way of example, when the user 50 is at location 310, then the audio from or associated with the region of the information space 78 defined by the corresponding view 314 may be played to the exclusion of audio outside the region. And consequently, when the user moves to the location 312, then the audio which is played is shifted to that which is from or associated with the region of the information space 78 defined by the corresponding updated view 316, the audio being played to the exclusion of other audio from the information space 78. It will be appreciated that the views associated with each location may be two-dimensional or three-dimensional depending upon the nature of content being presented in the information space 78. Accordingly, audio may be associated with a two-dimensional or three-dimensional region of the information space 78. In this manner, audio presented to the user corresponds directly to the region of the information space 78 which the user is actively viewing.

Figure 32:
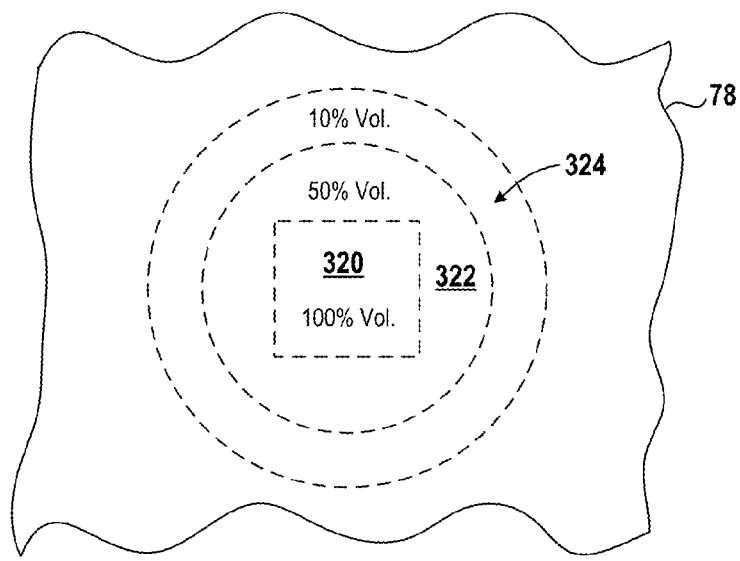
FIG. 32 illustrates concentric regions of an information space from which audio is blended, in accordance with an embodiment of the invention.

FIG. 32 illustrates concentric regions of an information space from which audio is blended, in accordance with an embodiment of the invention. As shown, audio from various regions of the information space 78 may be blended to provide the user with audio information not just about the currently viewed region of the information space, but nearby regions as well. In the illustrated embodiment, the user is currently viewing a region 320 of the information space 78. The audio from this region 320 will be played back at a 100% volume setting. However, audio from concentric surrounding regions 322 and 324 are played back at a 50% volume level and a 10% volume level, respectively, and mixed with the audio from the primary region 320 that is actively being viewed by the user. In this manner, a portion of audio from regions extending beyond that which is currently being viewed by the user is provided. It will be appreciated that the specific volume levels and the configuration of the regions for which audio volume level is adjusted may vary in accordance with various embodiments. In some embodiments, volume level decreases with distance from the view region of the information space associated with the user's current location. The provision of audio from nearby regions may alert the user to something interesting occurring in those regions, and may also provide the user with a more immersive experience of interaction with content in the information space 78. While in the illustrated embodiment, discreet zones are defined for audio mixing, it will be appreciated that in other embodiments, the volume level of audio may be defined according to a continuous function based on distance of the audio from the view region of the user or from some other defined region or location within the information space 78.

Figure 33:
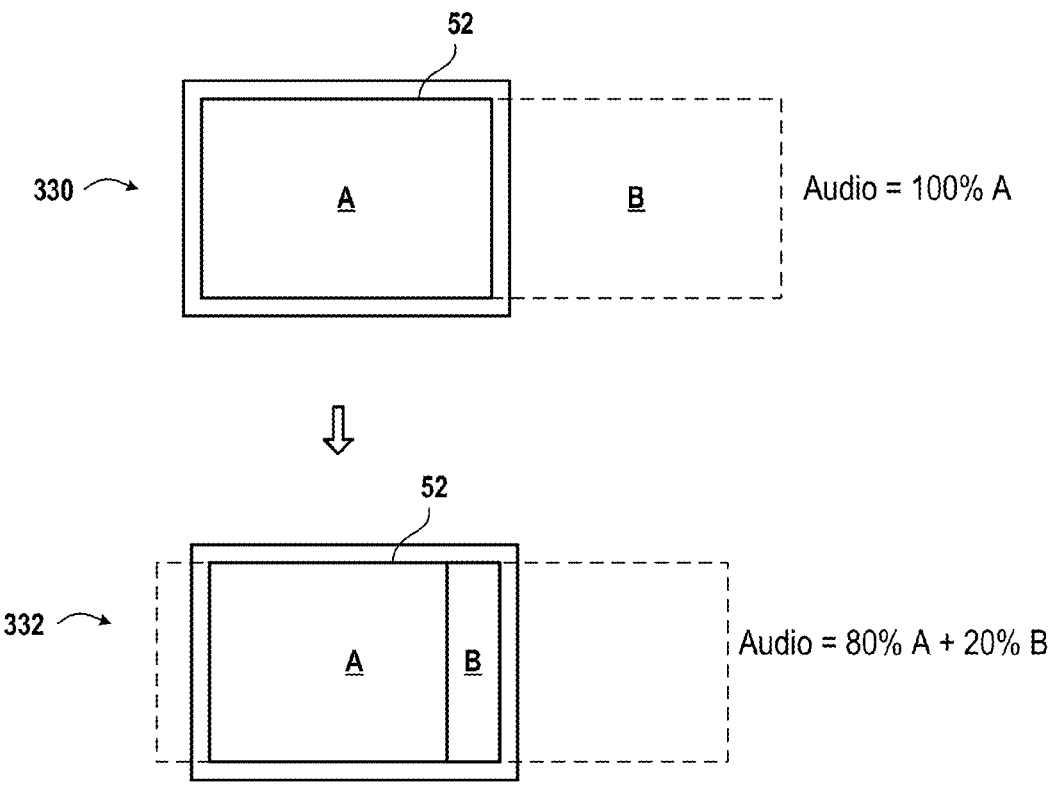
FIG. 33 illustrates the progressive revealing of an adjacent render space from a side of a display, in accordance with an embodiment of the invention.

In one embodiment, audio from adjacent render spaces is presented in proportion to the amount of the user's view that is occupied by a given render space. For example, FIG. 33 illustrates the progressive revealing of an adjacent render space from a side of the display, in accordance with an embodiment of the invention. At scene 330, the user (not shown) is positioned at an initial location so as to view the render space A on the display screen 52. At this location, the audio output is 100% composed of audio associated with content of the render space A. At scene 332, the user has moved to the left so as to reveal the adjacent render space B on the right of the render space A. At this location, the audio output is mixed audio from both of the render spaces A and B in proportion to their relative display on the display screen 52. For example, if the location of the user is such that the render space A occupies 80% of the user's view and the render space B occupies 20% of the user's view, then the audio from the render spaces A and B is mixed in a relative proportion of 80% to 20%, respectively. Thus, when a user moves so as to effect exposure of an adjacent render space into their view of the information space presented on the display, then the volume of the audio associated with the primary render space is proportionally decreased while the volume of audio associated with the adjacent render space is proportionally increased.

Figure 34:
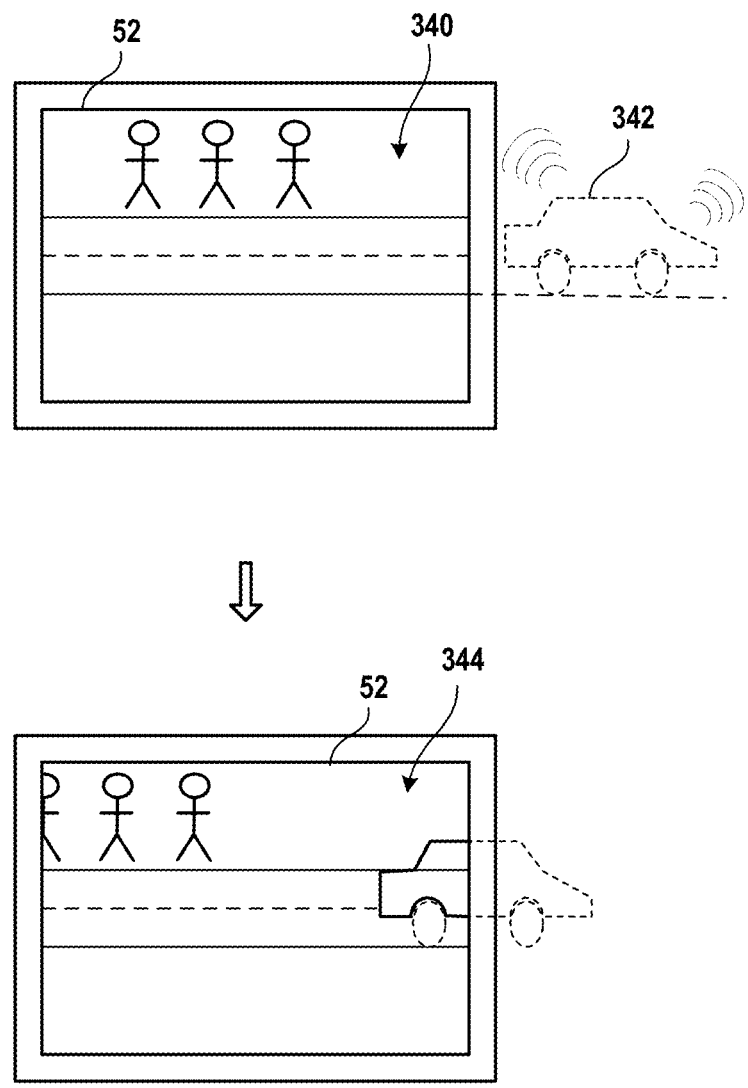
FIG. 34 illustrates a sequence wherein a user is able to hear audio from a region of an information space beyond that which is currently being viewed on a display screen, in accordance with an embodiment of the invention.

FIG. 34 illustrates a sequence wherein a user is able to hear audio from a region of the information space beyond that which is currently being viewed on the display screen 52, in accordance with an embodiment of the invention. When the user (not shown) is positioned at an initial location in front of the display screen 52, a view 340 of the information space is presented on the display screen 52. However, there may be an object such as a vehicle 342 that is situated in a region nearby the view 340 but not visible in the view 340 presented to the user. It may be useful for the user to be able to hear audio related to the vehicle 342. Therefore, in one embodiment, the audio sound from the vehicle 342 is output so that the user can hear the vehicle 342 even though in the current view 340, the user is not able to see the vehicle on the display screen 52. By hearing the vehicle 342, the user may be alerted to its presence, and may move so as to be able to view the region in which the vehicle is located. As shown in the illustrated embodiment, the user may move to the left relative to the display screen 52, so as to be able to view the region to the right of the view 340 in an updated view 52 presented on the display screen 52.

It can be useful to provide audio from an adjacent or nearby region of the information space that is not currently presented, so as to alert the user to significant or otherwise noteworthy events or content in a nearby region. In one embodiment, audio from a non-visible region nearby or adjacent to that being currently presented, is mixed with the audio from the currently presented region if it has an amplitude or other measure of its intensity above a predefined threshold level. In this manner, the user is able to hear significant sounds from adjacent regions of the information space.

Figure 35:
FIG. 35 illustrates a view of a room in which multiple users are viewing a display screen, in accordance with an embodiment of the invention.

FIG. 35 illustrates a view of a room in which multiple users 350, 352, and 354 are viewing a display screen 52. When multiple users are present, it presents a challenge of determining how to provide the interactive effect of viewing an information space as described elsewhere, when there are multiple viewpoints of the multiple users.

Figure 36:
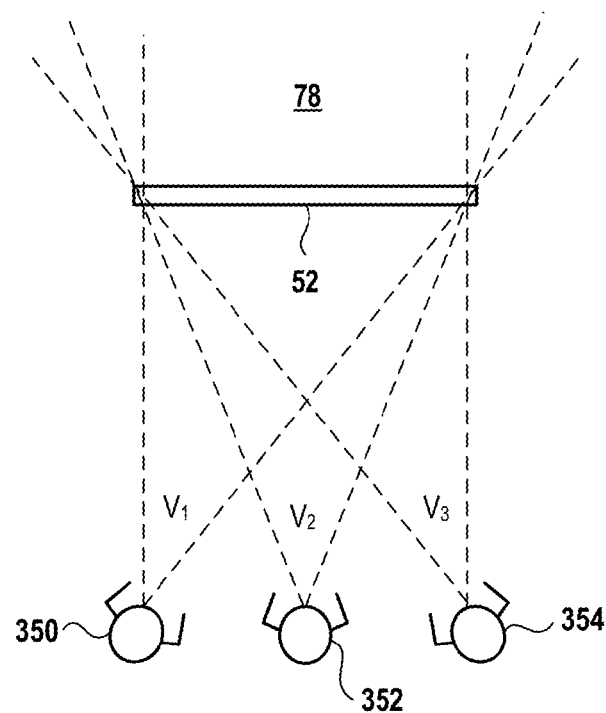
FIG. 36 illustrates a plurality of users viewing an information space through a display screen, in accordance with an embodiment of the invention.
Figure 37:
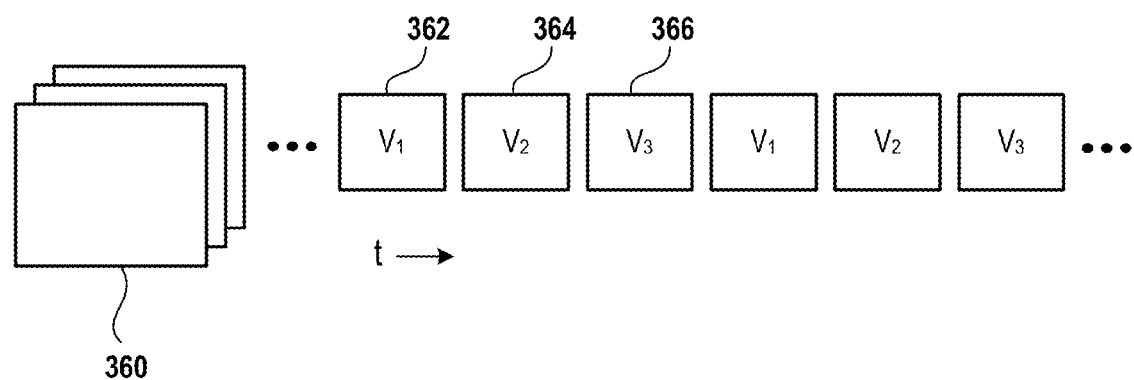
FIG. 37 illustrates multiplexed image frames corresponding to the views of several users, in accordance with an embodiment of the invention.

FIG. 36 illustrates a plurality of users viewing the information space 78 through the display screen 52. As shown, each of the users 350, 352, and 354 has a respective view $V_1$, $V_2$, and $V_3$ of the information space 78, that is determined based on the location of each user. In one embodiment, in order to preserve the sense of the information space 78 having a persistent location behind the display screen 78 that is common to all the users, each user's individual view of the information space is presented through the display screen 52. In one embodiment, as shown with reference to FIG. 37, image frames corresponding to each of the views of the users are multiplexed in the image stream 360 that is rendered on the display screen 52. Thus, by way of example, an image frame 362 may present the view $V_1$, followed by an image frame 364 presenting the view $V_2$, followed by image frame 366 presenting view $V_3$, the sequence of views presented in subsequent image frames being repeated so as to provide a multiplexed image stream containing image frames corresponding to each of the user's views. Each of the users 350, 352, and 354, may wear shutter glasses which allows them to view on those image frames from the image stream which present the view of the information space associated with their location. In this manner, each of the users is able to view the information space from their perspective as defined based on their individual locations.

Figure 38:
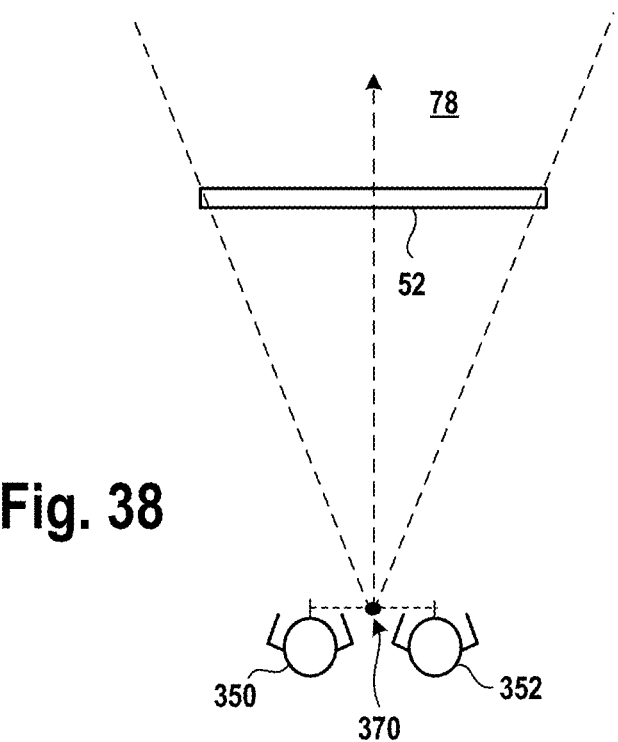
FIG. 38 illustrates users shown at initial locations, with an average location, in accordance with an embodiment of the invention.
Figure 39:
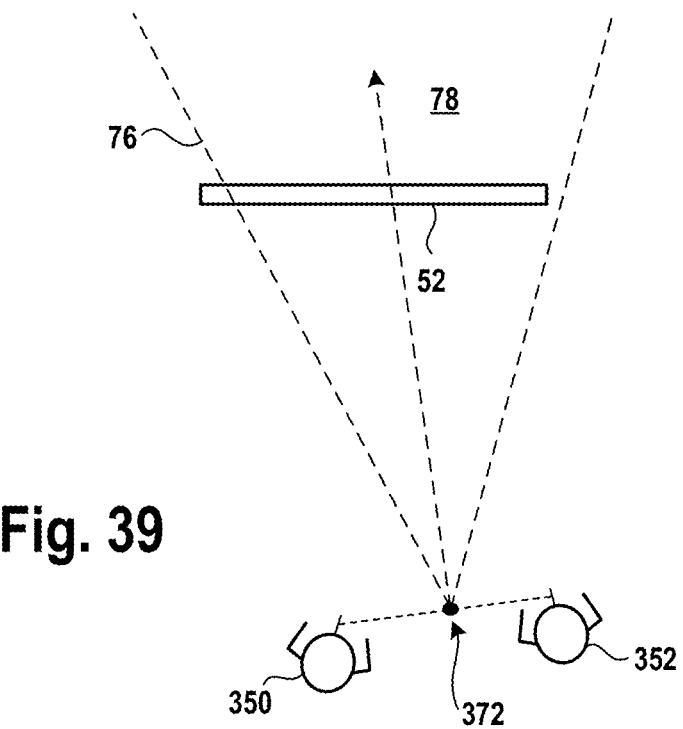
FIG. 39 users having changed locations, with an updated average location defined, in accordance with an embodiment of the invention.

In another embodiment, the view of the information space 78 presented on the display screen 52 may be determined based on a combination of the locations of the users. FIGS. 38 and 39 illustrate views of the information space which are based upon an average location of multiple users. In FIG. 38, the users 350 and 352 are shown at initial locations, with an average location 370. The average location 370 is therefore utilized to determine the perspective according to which the view of the information space 78 is determined and rendered on the display screen 52. At FIG. 39, the users 350 and 352 have changed locations, so that their average location is now defined at location 372. The view of the information space 78 is therefore adjusted based on the updated average location 372 in accordance with the principles described elsewhere herein.

Figure 40:
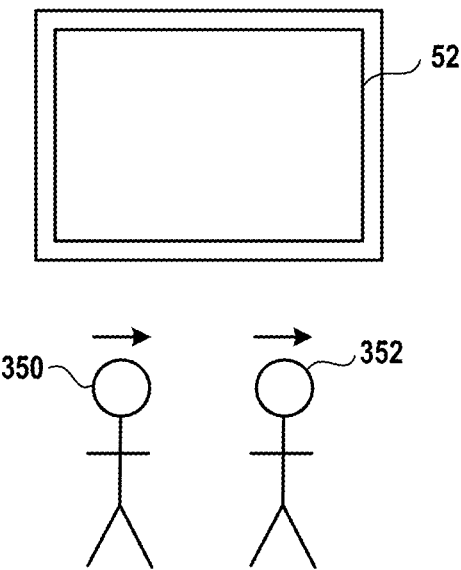
FIG. 40 illustrates two users viewing an information space through a display screen, in accordance with an embodiment of the invention.

FIG. 40 illustrates two users 350 and 352 viewing an information space through display screen 52, in accordance with an embodiment of the invention. In one embodiment, the view of the information space presented through the display screen 52 is changed when both users move in substantially similar directions in a substantially simultaneous fashion, but not when the users do not move in substantially similar directions in a substantially simultaneous fashion. The location utilized to determine the view provided may be an average location of the users. In other words, at their initial locations, an average location of the users determines the initial view of the information space. If both users move in substantially similar directions at approximately the same time, then the view is updated based on an average location of the users' new locations. However, if the users do not move in substantially similar directions at approximately the same time, then no change in the view of the information space is presented.

Figure 41:
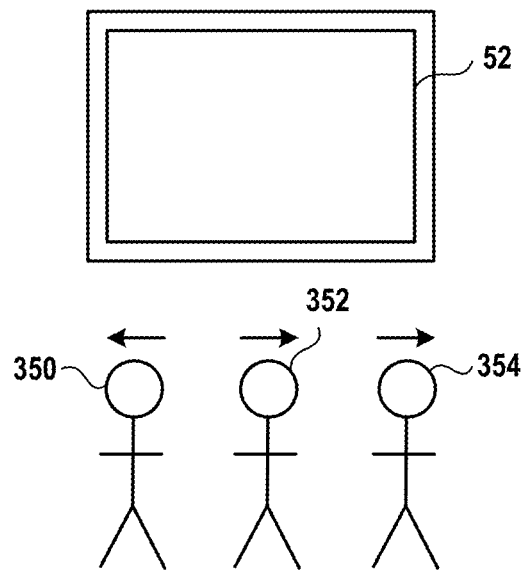
FIG. 41 illustrates three users viewing an information space through a display screen, in accordance with an embodiment of the invention.

FIG. 41 illustrates three users 350, 352, and 354, viewing the information space through the display screen 52. In one embodiment, when a majority of the users move in a substantially similar direction in a substantially simultaneous fashion, then the view of the information space is updated based on the updated locations of the users. Again, the location utilized to determine the view presented on the display screen 52 may be an average location of the users. In another embodiment, the location utilized to determine the view of the information space presented on the display screen 52 is updated only when all of the users move in substantially similar directions in a substantially simultaneous fashion.

In other embodiments, various weighting may be applied to the locations of the users to allow a given user to affect the overall location utilized to determine the view of information space to a greater extent than another user. For example, the location of a centrally located user, such as user 352, may be weighted more highly than the locations of the users 350 and 354. In this manner, the location of the user 352 affects the overall location determined for the group of users, and therefore controls the view provided on the display screen 52 to a larger extent than the other users.

Figure 42:
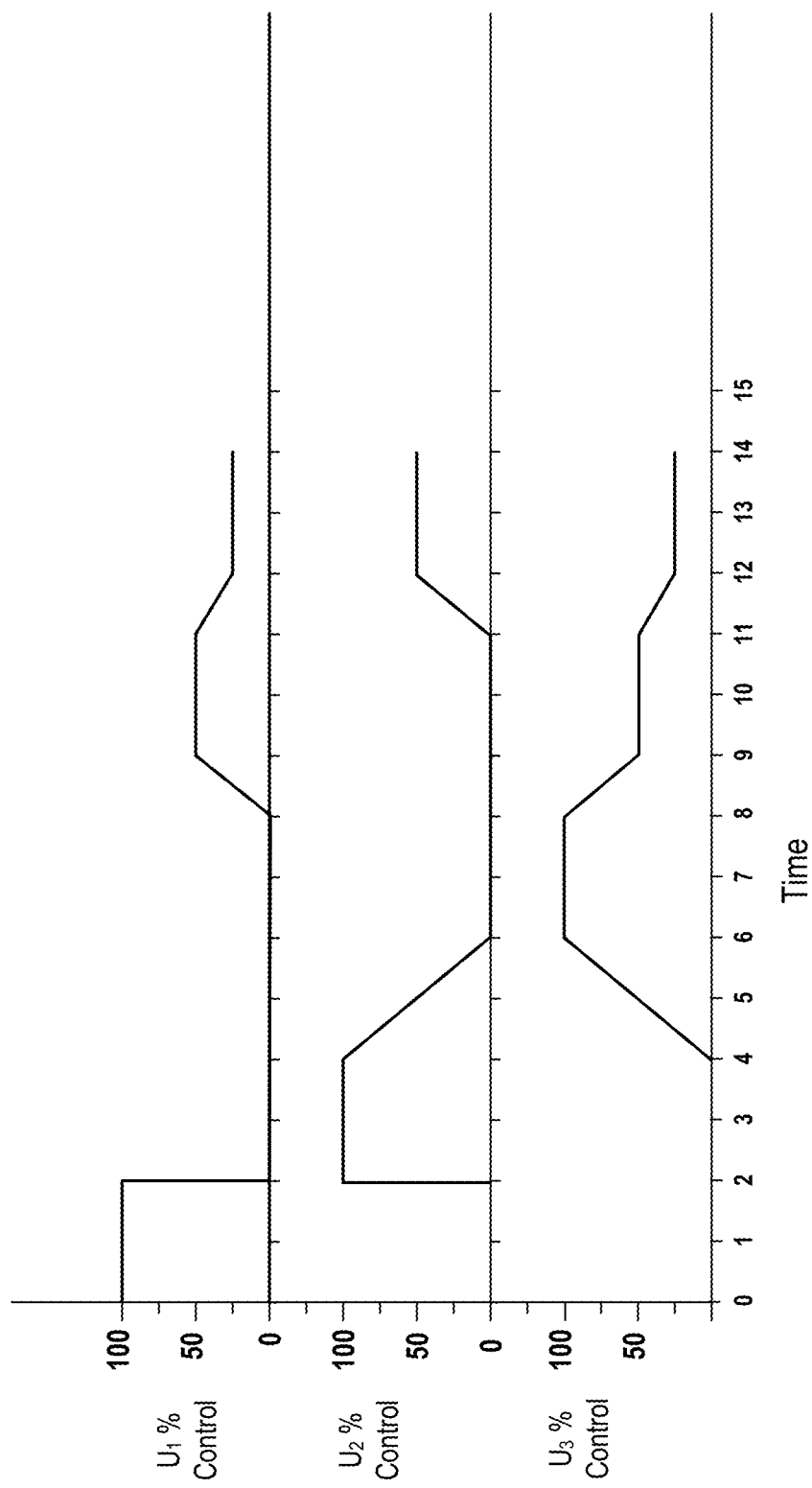
FIG. 42 illustrates a graph showing the percentage of control of the view of an information space associated with each of three users over time, in accordance with an embodiment of the invention.

In still other embodiments, control of the view of the information space may vary over time. By way of example, FIG. 42 illustrates a graph showing the percentage of control of the view of the information space associated with each of three users U1, U2, and U3, over time. From time=0 to time=2, user U1 has 100% control. From time=2 to time=4, user U2 has 100% control. From time=4 to time=6, the percentage control of user U2 drops to zero, while the percentage control of user U3 increases to 100%. From time=6 to time=8, the user U3 has 100% control of the view. From time=8 to time=9, the percentage control of user U3 drops to 50% while the percentage control of user U1 increases to 50%. From time=9 to time=11, users U1 and U3 each have 50% control. From time=11 to time=12, the percentage control of each of users U1 and U3 drops to 25% while the percentage control of user U2 increases to 50%. From time=12 to time=14, these control percentages are maintained.

It will be appreciated that in various embodiments, individual users' relative levels of control of the overall view of the group may vary in accordance with any number of factors. For example, in a video game, there may be certain scenes in which one of a plurality of players is responsible for performing an activity, and so control of the view is primarily shifted to that player. Or there may be turn-based activities, so that the control of the view shifts from one player to the next when it is their turn.

In addition to the embodiments thus described, several alternative embodiments are contemplated, including the following enumerated embodiments:

A1. A method for presenting content on a display screen, comprising: presenting a first portion of a content space on the display screen; tracking a location of a viewer in front of the display screen; in response to detecting a lateral movement of the viewer relative to the display screen, exposing an adjacent second portion of the content space from an edge of the display screen opposite a direction of the lateral movement.

A2. The method of embodiment A1, wherein a first region of the content space defined by the first portion includes a first content item; and wherein a second region of the content space that is partially defined by the second portion includes a second content item.

B1. A method for presenting content on a display screen, comprising: presenting a first portion of a content space on the display screen; tracking a location of a viewer in front of the display screen; in response to detecting a movement of the viewer towards the display screen, exposing one or more adjacent portions of the content space from one or more respective edges of the display screen, and reducing a size of the presented first portion.

C1. A method for presenting content on a display screen, comprising: assigning first content to a first render space; assigning second content to a second render space; presenting a perspective projection of the first render space and the second render space on the display screen; adjusting the perspective projection based on tracked movement of a user in front of the display screen.

C2. The method of embodiment C1, wherein the adjusting of the perspective projection provides an appearance of the first and second render spaces having a substantially persistent orientation in a real space occupied by both the display screen and the viewer.

C3. The method of embodiment C1, wherein the perspective projection is defined by a mapping of the first render space and the second render space onto a planar image area, and wherein the presentation of the perspective projection is defined by presentation of the planar image area on the display screen.

C4. The method of embodiment C1, wherein the first content or the second content includes one or more of an image, a video, a webpage, a browser, or a game.

C5. The method of embodiment C1, further comprising, in response to detecting a gesture of the user, reassigning the first content to the second render space and reassigning the second content to the first render space, and updating the presentation of the perspective projection of the first and second render spaces accordingly.

D1. A method, comprising: tracking a location of a user in a vicinity of a display; determining a location of a virtual viewpoint in a virtual space based on the tracked location of the user; determining a field of view of the user, the field of view of the user defined by a projection of a virtual window, from a vertex defined by the virtual viewpoint, to a content space in the virtual space; rendering the field of view of the user on the display.

D2. The method of embodiment D1, wherein a lateral movement of the user relative to the display produces a corresponding lateral movement of the virtual viewpoint relative to the virtual window in a same direction as the lateral movement of the user, the lateral movement of the virtual viewpoint producing a shift in the field of view of the user in a direction opposite to the lateral movement of the virtual viewpoint.

D3. The method of embodiment D2, wherein the content space includes a first content surface and a second content surface adjacent to the first content surface; wherein an initial field of view of the user defined prior to the lateral movement of the user includes an entire portion of the first content surface; and wherein a subsequent field of view of the user defined after the lateral movement of the user includes a major portion of the first content surface and a minor portion of the second content surface.

D4. The method of embodiment D3, wherein the first content surface defines a first plane, and the second content surface defines a second plane that is not parallel with the first plane.

D5. The method of embodiment D1, wherein a movement of the user from a location substantially centered in front of the display towards the display produces a corresponding movement of the virtual viewpoint relative to the virtual window, the movement of the virtual viewpoint producing an expansion in the field of view of the user.

D6. The method of embodiment D5, wherein the content space includes a first content surface and a second content surface adjacent to the first content surface; wherein an initial field of view of the user defined prior to the movement of the user towards the display includes an entire portion of the first content surface; and wherein a subsequent field of view of the user defined after the movement of the user towards the display includes the entire portion of the first content surface and a portion of the second content surface.

D7. The method of embodiment D6, wherein the first content surface defines a first plane, and the second content surface defines a second plane that is not parallel with the first plane.

D8. The method of embodiment D1, wherein tracking the location of the user includes tracking a facial region of the user.

Figure 43:
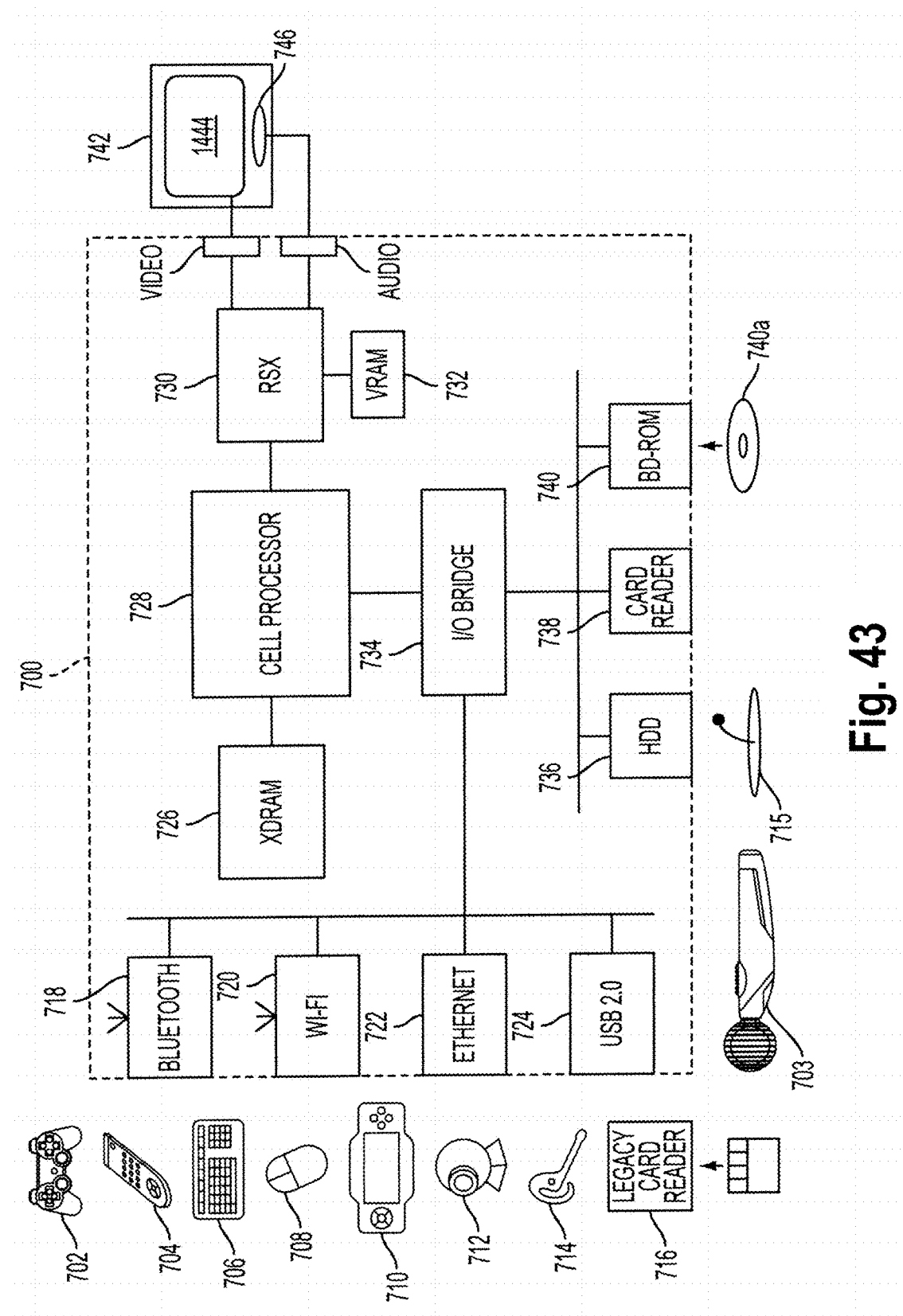
FIG. 43 illustrates hardware and user interfaces that may be used to provide interactivity with a video game, in accordance with an embodiment of the present invention.

FIG. 43 illustrates hardware and user interfaces that may be used to provide interactivity with a video game, in accordance with one embodiment of the present invention. FIG. 43 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 44:
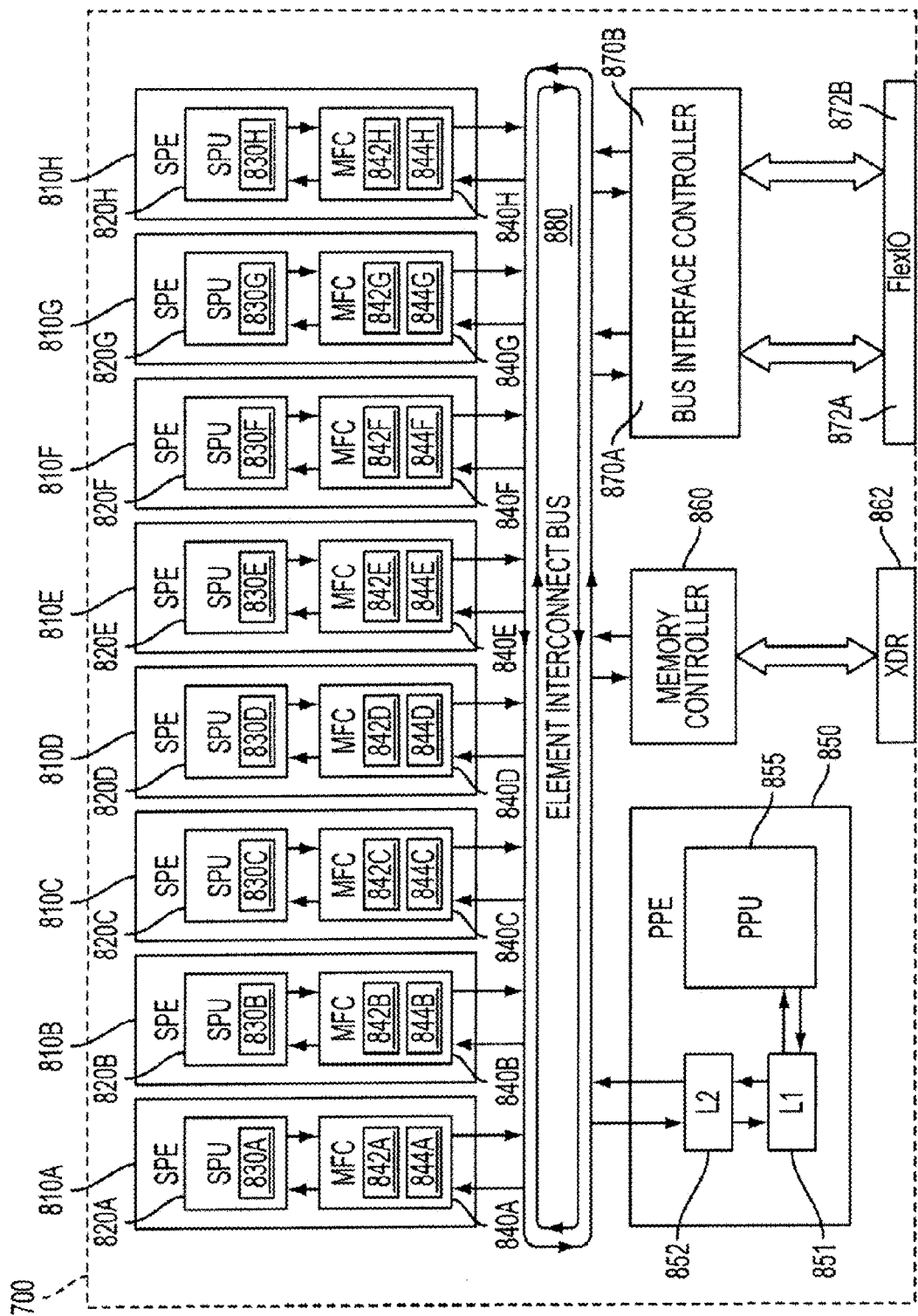
FIG. 44 illustrates additional hardware that may be used to process instructions, in accordance with an embodiment of the present invention.

FIG. 44 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 45:
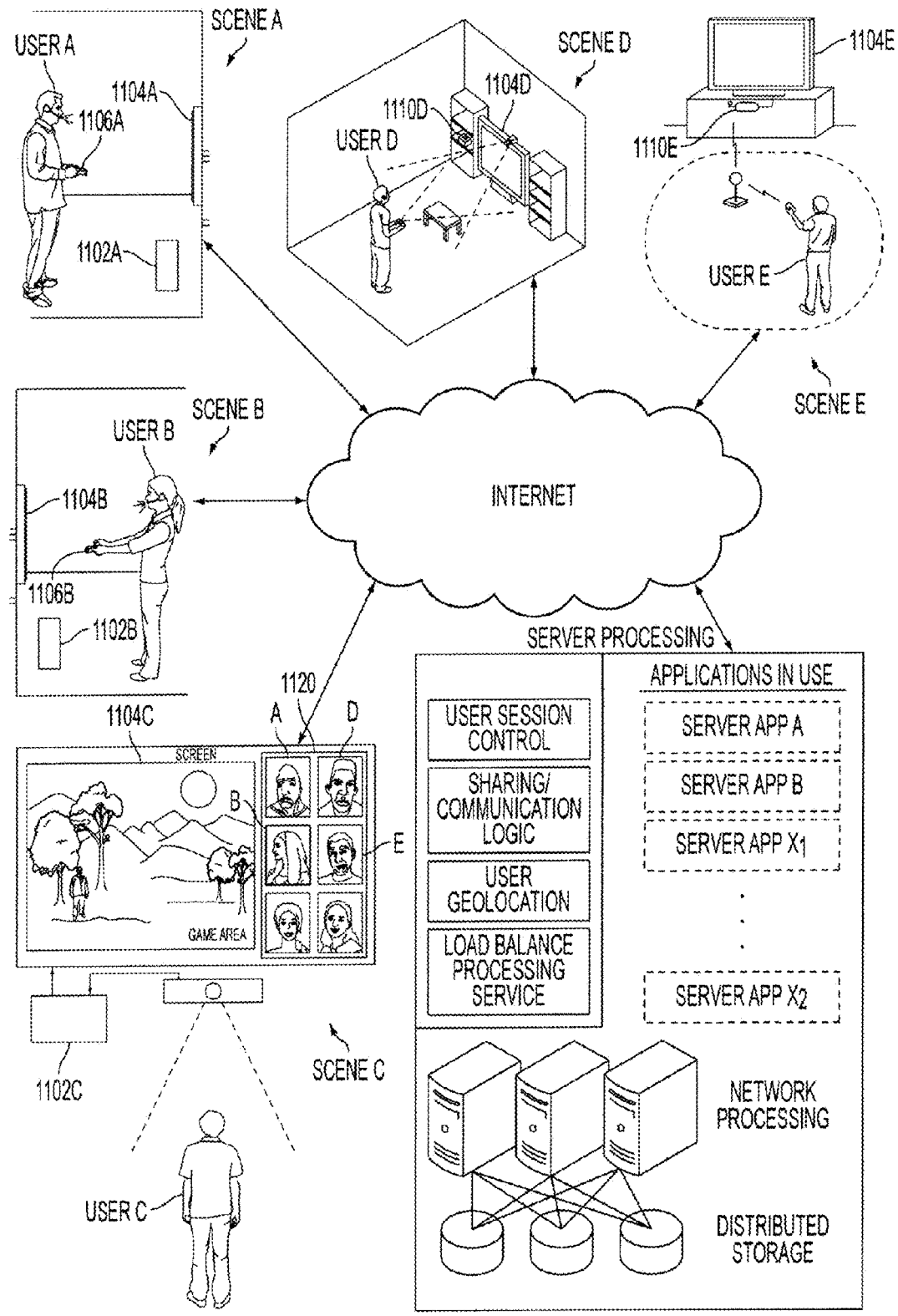
FIG. 45 is an exemplary illustration of scenes with respective users interacting with game clients that are connected to server processing via the internet, in accordance with an embodiment of the present invention.

FIG. 45 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 45, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While FIG. 45 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 46:
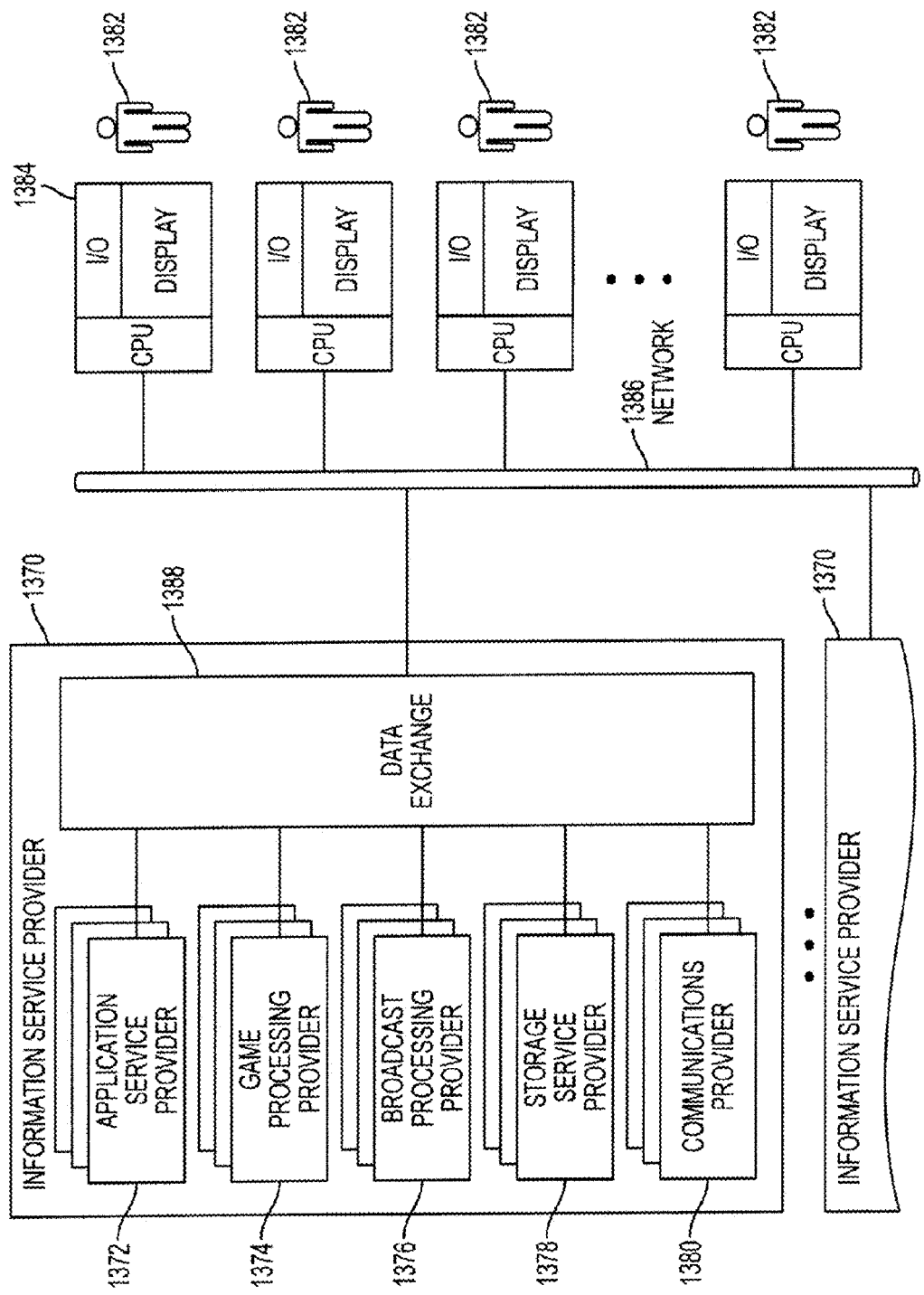
FIG. 46 illustrates an embodiment of an Information Service Provider architecture, in accordance with an embodiment of the invention.

FIG. 46 illustrates an embodiment of an Information Service Provider architecture. Information Service Providers (ISP) 1370 delivers a multitude of information services to users 1382 geographically dispersed and connected via network 1386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1370 includes Application Service Provider (ASP) 1372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1370 includes a Game Processing Server (GPS) 1374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1388 interconnects the several modules inside ISP 1370 and connects these modules to users 1382 via network 1386. Data Exchange 1388 can cover a small area where all the modules of ISP 1370 are in close proximity, or can cover a large geographic area when the different modules are geographically dispersed. For example, Data Exchange 1388 can include a fast Gigabit Ethernet (or faster) within a cabinet of a data center, or an intercontinental virtual area network (VLAN).

Users 1382 access the remote services with client device 1384, which includes at least a CPU, a display and I/O. The client device can be a PC, a mobile phone, a netbook, a PDA, etc. In one embodiment, ISP 1370 recognizes the type of device used by the client and adjusts the communication method employed. In other cases, client devices use a standard communications method, such as html, to access ISP 1370.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for presenting content on a display screen, comprising:

presenting first content on the display screen, the first content being associated with a first detected viewing position of a user that is identified in a region in front of the display screen, the first content being defined by video content;

presenting at least part of second content on the display screen along with the first content, the second content being progressively displayed along an edge of the display screen in proportional response to a movement of the user from the first detected viewing position to a second detected viewing position of the user, wherein the edge of the display screen is substantially opposite a lateral direction relative to the display screen that is defined by the movement of the user from the first detected viewing position to the second detected viewing position;

wherein the at least part of the second content is presented as a blended transition with the first content.

2. The method of claim 1, wherein the proportional response is linear or non-linear.

3. The method of claim 1, wherein the second content is presented as a perspective projection to provide an appearance on the display screen of the second content oriented at an angle relative to the first content.

4. The method of claim 1, wherein in response to a radial movement of the user relative to the display screen, the radial movement defined by the change from the first detected viewing position to the second detected viewing position, a size of the presentation of the first content is adjusted.

5. The method of claim 1, wherein the second content includes one or more of an image, a video, a webpage, a browser, or a game.

6. A method for presenting content on a television display screen, comprising:
    assigning first content to a first render space, the first content being defined by a television program;
    assigning second content to a second render space;
    presenting the first render space on the television display screen while tracking a position of a viewer in front of the display screen;
    presenting a transition to the second render space from the first render space in response to changes in viewer position, the first content and the second content remaining in the first and second render spaces during transitioning;
    wherein the first render space defines a first planar surface, the presentation of the first render space providing an appearance of the first planar surface being substantially parallel with a plane defined by the display screen; and
    wherein the second render space defines a second planar surface, the presentation of the second render space being distorted to provide an appearance of the second planar surface being substantially not parallel with the plane defined by the display screen.

7. The method of claim 6, wherein the transition is defined by a progressive movement of the second render space from off-screen to on-screen.

8. The method of claim 6, wherein the transition is defined by a decrease in display area of the display screen occupied by the presentation of the first render space and a simultaneous increase in display area of the display screen occupied by the presentation of the second render space.

9. The method of claim 6, wherein the second content includes one or more of an image, a video, a webpage, a browser, or a game.

10. The method of claim 6, further comprising:
    in response to detecting a gesture of the user during the presentation of the transition, reassigning the first content to the second render space and reassigning the second content to the first render space, and updating the presentation of the first and second render spaces accordingly.

11. A method for presenting content on a display screen, comprising:
    assigning first content to a first render space;
    assigning second content to a second render space;
    presenting the first render space on the display screen while tracking a position of a viewer in front of the display screen;
    presenting a transition to the second render space from the first render space in response to changes in viewer position, the first content and the second content remaining in the first and second render spaces during transitioning;
    in response to detecting a gesture of the user during the presentation of the transition, reassigning the first content to the second render space and reassigning the second content to the first render space, and updating the presentation of the first and second render spaces accordingly.

12. A method, comprising:
    tracking a movement of a user from an first location to a second location in a vicinity of a display;
    moving a virtual viewpoint from a first location in a virtual space to a second location in the virtual space based on the tracked movement of the user, the movement of the virtual viewpoint relative to a virtual window in the virtual space being in a same direction as the movement of the user relative to the display;
    updating a field of view of the user, from a first field of view corresponding to the first location of the virtual viewpoint, to a second field of view corresponding to the second location of the virtual viewpoint,
    wherein the first field of view of the user is defined by a projection of a virtual window, from a vertex defined by the first location of the virtual viewpoint, to a content space in the virtual space, and
    wherein the second field of view of the user is defined by a projection of the virtual window, from a vertex defined by the second location of the virtual viewpoint, to the content space in the virtual space;
    rendering, on the display, the updating of the field of view from the first field of view to the second field of view;
    wherein the content space includes a first content panel and a second content panel;
    wherein the first field of view includes an entire portion of the first content panel; and
    wherein the second field of view includes a portion of the first content panel and a portion of the second content panel;
    detecting a gesture of the user during the rendering of the second field of view;
    in response to detecting the gesture, shifting the first and second content panels relative to the virtual space, the shifting of the first and second content panels being in a lateral direction relative to the virtual window, and updating the second field of view in accordance with the shifting of the first and second content panels.

13. The method of claim 12, further comprising,
    in response to detecting a second gesture, swapping locations of the first content panel and the second content panel within the content space, and updating the second field of view in accordance with the swapping of the first and second content panels.

14. The method of claim 12, wherein the first content panel and the second content panel are substantially parallel to each other.

* * * * *